(12) United States Patent
Jiang

(10) Patent No.: US 12,214,402 B2
(45) Date of Patent: Feb. 4, 2025

(54) ELECTRIC PIPE EXPANDER

(71) Applicant: Navac Inc., Lyndhurst, NJ (US)

(72) Inventor: Yourong Jiang, Zhejiang (CN)

(73) Assignee: NAVAC Inc., Lyndhurst, NJ (US)

( * ) Notice: Subject to any disclaimer, the term of this patent is extended or adjusted under 35 U.S.C. 154(b) by 0 days.

(21) Appl. No.: 18/323,360

(22) Filed: May 24, 2023

(65) Prior Publication Data
US 2023/0294156 A1    Sep. 21, 2023

Related U.S. Application Data

(63) Continuation of application No. 17/598,303, filed as application No. PCT/CN2020/080586 on Mar. 23, 2020.

(30) Foreign Application Priority Data

Mar. 27, 2019 (CN) .......................... 201910239151.5
Mar. 27, 2019 (CN) .......................... 201920402356.6
(Continued)

(51) Int. Cl.
*B21D 41/02* (2006.01)
*B21D 19/04* (2006.01)
(Continued)

(52) U.S. Cl.
CPC ......... *B21D 41/028* (2013.01); *B21D 19/046* (2013.01); *B21D 39/12* (2013.01);
(Continued)

(58) Field of Classification Search
CPC .... B21D 41/021; B21D 41/023; B21D 19/04; B21D 19/046; B21D 39/12; B21D 39/20;
(Continued)

(56) References Cited

U.S. PATENT DOCUMENTS 4,606,214 A * 8/1986 Miyazaki ............... B21D 41/02
                                                                 72/370.03
5,090,226 A * 2/1992 Takeoka ............... B21D 41/023
                                                                 72/125
(Continued)

FOREIGN PATENT DOCUMENTS

CN        101028640        9/2007
CN        201239764        5/2009
(Continued)

OTHER PUBLICATIONS

International Search Report (Form PCT/ISA/210) of PCT/CN2020/080586, mailed on Jun. 30, 2020, with English translation thereof, pp. 1-6.
(Continued)

*Primary Examiner* — Jared O Brown
(74) *Attorney, Agent, or Firm* — Greenberg Traurig, LLP

(57) ABSTRACT

An electric pipe expander and intelligent control circuit for the electric pipe expander are provided. The electric pipe expander includes a pipe expander body and a mandrel sliding cavity disposed on the pipe expander body. A chuck body capable of clamping a pipe to be processed is disposed at an opening end of the mandrel sliding cavity. A mandrel is slidingly connected in the mandrel sliding cavity, an outer side end of the mandrel is provided with an obliquely disposed pipe expanding cone, an inner side end of the mandrel is provided with an elastic body accommodating cavity. Flat keys are disposed on the mandrel, and an elastic body is clamped and disposed between the flat keys and a bottom surface of the elastic body accommodating cavity.

9 Claims, 12 Drawing Sheets

| (30) | Foreign Application Priority Data | | |
|---|---|---|---|
| Mar. 27, 2019 | (CN) | ......................... | 201920403105.X |
| Mar. 27, 2019 | (CN) | ......................... | 201920403433.X |
| Mar. 27, 2019 | (CO) | ......................... | 201920402150.3 |
| Mar. 11, 2020 | (CN) | ......................... | 202020298163.3 |
| Mar. 11, 2020 | (CN) | ......................... | 202020299099.0 |
| Mar. 11, 2020 | (CN) | ......................... | 202020299525.0 |

(51) Int. Cl.
  *B21D 39/12* (2006.01)
  *B25F 5/02* (2006.01)
  *H02K 7/08* (2006.01)
  *H02K 7/116* (2006.01)
  *H02K 7/14* (2006.01)

(52) U.S. Cl.
  CPC .............. *B21D 41/023* (2013.01); *B25F 5/02* (2013.01); *H02K 7/081* (2013.01); *H02K 7/1166* (2013.01); *H02K 7/145* (2013.01)

(58) Field of Classification Search
  CPC .... B21D 41/02; B21D 41/026; B21D 41/028; B29C 57/045; B29C 57/12
  USPC ...................................................... 72/370.11
  See application file for complete search history.

(56) References Cited

U.S. PATENT DOCUMENTS

| 6,708,548 | B2* | 3/2004 | Ehrke | .................... | B21D 41/02 |
| | | | | | 72/370.1 |
| 8,291,737 | B2* | 10/2012 | Huang | ................. | B21D 41/021 |
| | | | | | 72/120 |
| 8,517,715 | B2* | 8/2013 | Thorson | ............... | B21D 41/026 |
| | | | | | 72/392 |
| 9,492,857 | B2* | 11/2016 | Hasenberg | ........... | B21D 41/021 |
| 10,695,816 | B2* | 6/2020 | Murg | ................... | B21D 41/021 |
| 11,980,924 | B2 | 5/2024 | Jiang | | |

FOREIGN PATENT DOCUMENTS

| CN | 201239764 Y | | 5/2009 | | |
|---|---|---|---|---|---|
| CN | 109926506 | | 6/2019 | | |
| CN | 209969402 | | 1/2020 | | |
| CN | 209969403 | | 1/2020 | | |
| CN | 209969404 | | 1/2020 | | |
| CN | 209969405 | | 1/2020 | | |
| CN | 209969406 | | 1/2020 | | |
| CN | 211700365 U | * | 10/2020 | | |
| EP | 2786816 | | 10/2014 | | |
| JP | H09271854 | | 10/1997 | | |
| JP | 2007167953 A | * | 7/2007 | ............ | B21D 55/00 |
| JP | 3951275 | | 8/2007 | | |
| JP | 3951275 B2 | | 8/2007 | | |

OTHER PUBLICATIONS

English translation of First Office Action for Chinese Application No. 201910239151.5, dated Mar. 12, 2020, seven (7) pages.
English translation of Second Office Action for Chinese Application No. 201910239151.5, dated Jul. 2, 2020, eight (8) pages.
English translation of Third Office Action for Chinese Application No. 201910239151.5, dated Nov. 3, 2020, four (4) pages.

* cited by examiner

ELECTRIC PIPE EXPANDER

CROSS REFERENCE TO RELATED APPLICATION

This application is a continuation of U.S. patent application Ser. No. 17/598,303 filed Sep. 27, 2021, which is a § 371 Nationalization of International Patent Application No. PCT/CN2020/080586, which claim priority to Chinese Application Nos. CN201920403433.X, filed Mar. 27, 2019, CN201910239151.5, filed Mar. 27, 2019, CN201920402356.6, filed Mar. 27, 2019, CN201920403105.X, filed Mar. 27, 2019, CN201920402150.3, filed Mar. 27, 2019, and CN202020299525.0, filed Mar. 11, 2020, each of which is incorporated herein by reference in its entirety.

TECHNICAL FIELD

The present invention relates to a pipe expander, and more particularly relates to an electric pipe expander with the advantages of simple structure, time-saving and labor-saving effects in pipe expanding processing and good pipe socket processing quality.

DESCRIPTION OF RELATED ART

In the process of installing or repairing an air conditioner, a pipe expander is generally needed to perform pipe socket expanding processing on a refrigerant copper pipe. Existing pipe expanders generally include manual pipe expanders and electric pipe expanders. The manual pipe expander has a small size and light weight, but wastes time and labor in the pipe expanding processing, and the pipe socket processing quality is greatly influenced by artificial factors. The electric pipe expander saves time and labor in the pipe expanding processing, but is inconvenient to carry and use due to its relatively complex internal mechanical structure and large size. Meanwhile, the two kinds of pipe expanders generally require clamping the copper pipe for positioning by using a clamp with a threaded rotary rod during the pipe expanding processing, so that time and labor are wasted during clamping, the positioning precision of the copper pipe is low, and the pipe socket processing quality cannot be guaranteed.

SUMMARY

The present invention mainly provides an electric pipe expander with the advantages of simple structure, high positioning precision of pipes to be processed, time-saving and labor-saving effects in pipe expanding processing and good pipe socket processing quality, and solves the technical problems of complicated structure, time waste and labor waste during positioning and clamping of the pipes to be processed, low positioning precision, pipe socket processing quality guaranteeing incapability and the like of the electric pipe expander in the prior art.

The present invention mainly solves the above technical problems through the following technical solution. An electric pipe expander includes a pipe expander body and a mandrel sliding cavity disposed on the pipe expander body. A chuck body capable of clamping a pipe to be processed is disposed at an opening end of the mandrel sliding cavity, a mandrel is slidably connected in the mandrel sliding cavity, an outer side end of the mandrel is provided with an obliquely disposed pipe expanding cone, an inner side end of the mandrel is provided with an elastic body accommodating cavity, a guide screw rod provided with a transmission screw nut is disposed on the pipe expander body opposite to an opening of the elastic body accommodating cavity, the guide screw rod extends into the elastic body accommodating cavity, flat keys are disposed on the mandrel, outer side ends of the flat keys are slidably connected to a worm gear and worm mechanism in an axial direction, inner side ends of the flat keys are slidably connected into axial key slots of the transmission screw nut, and an elastic body is clamped and disposed between the flat keys and a bottom surface of the elastic body accommodating cavity. The mandrel configured to push the pipe expanding cone to perform pipe expanding processing is driven through the worm gear and worm mechanism, so that time and labor are saved, and the pipe expanding processing efficiency is high. The elastic body is disposed between the corresponding flat keys in a mandrel accommodating cavity and a bottom surface of the mandrel accommodating cavity, during the pipe expanding processing, a worm gear rotates to drive the flat keys to rotate forward, the transmission screw nut synchronously advances along the guide screw rod, and the elastic body is axially compressed. The pipe expanding cone performs pipe expanding processing in a rotary pressing manner, in the processing period, the elastic body decelerates the axial moving speed of the mandrel through self deformation, and the single cycle axial deformation amount of the pipe socket is decreased, so that a peripheral shape of a pipe socket of the pipe to be processed becomes uniform, and the processing quality of the pipe socket is effectively guaranteed. On one hand, the guide screw rod achieves a support positioning and guide effect on the mandrel, and on the other hand, the mandrel can use a plastic material on the premise of ensuring a strength requirement, the strength is guaranteed through the transmission screw nut made of a metal material, the manufacturing cost can be reduced, at the same time, the weight of the whole machine can be reduced, and the use and carrying are convenient.

Preferably, a cone positioning hole is formed in an end surface of the mandrel corresponding to the pipe expanding cone, an included angle is formed between an axial line of the cone positioning hole and an axial line of the mandrel, and the pipe expanding cone is rotationally connected into the cone positioning hole through a cone bearing. The pipe expanding cone is obliquely fixed onto an outer end surface of the mandrel to realize the rotary pressing type pipe expanding processing. The pipe expanding cone maintains rotational connection with the mandrel through a cone bearing, so that the pipe expanding cone can freely rotate along a self axial line, so that rolling friction is maintained between the pipe expanding cone and a pipe expanding copper pipe during the rotary pressing pipe expanding processing, time and labor are saved in the pipe expanding processing, at the same time, the surface abrasion of the pipe expanding cone is uniform and consistent, the service life of the pipe expanding cone is prolonged, and the pipe expanding processing quality is indirectly guaranteed.

Preferably, a mandrel bearing is embedded in the pipe expander body corresponding to the outer side end of the mandrel, a support ring is disposed between a middle hole of the mandrel bearing and an outer ring surface of the mandrel, and an inner end of the support ring extends into a middle hole of a worm gear on the worm gear and worm mechanism and is in close fit with the worm gear. The support ring extends into the middle hole of the worm gear, so that the stable support of the mandrel can be realized through a single bearing, the cost is saved, and at the same time, the whole structure is more compact.

Preferably, the elastic body is an annular rubber component, and the guide screw rod extends into a middle hole of the elastic body. The elastic body made of an annular rubber material is low in cost, and at the same time, an annular structure provides a storage space for the guide screw rod, so that the thickness of the transmission screw nut can be reduced.

Preferably, a pipe expanding cavity is formed in the pipe expander body corresponding to the chuck body, a clamping end of the chuck body extends into the pipe expanding cavity and is clamped and fixed through a clamping connecting rod mechanism, and an outer end surface of the chuck body is in butt joint with a corresponding inner wall surface of the pipe expanding cavity. Through the arrangement of the pipe expanding cavity outside an end opening of the mandrel sliding cavity, the chuck body can be fed into the pipe expanding cavity from the end opening at the side surface of the chuck body, the chuck body is positioned in a circumferential direction through the clamping connecting rod mechanism, the outer end surface of the chuck body is positioned through the inner wall surface of the pipe expanding cavity, the axial displacement of the chuck body together with the pipe to be processed in the pipe expanding processing process is prevented, the positioning of the pipe to be processed is precise, and the pipe expanding processing quality is sufficiently guaranteed.

More preferably, a connecting rod accommodating cavity is formed in the pipe expander body corresponding to a periphery of the pipe expanding cavity, the clamping connecting rod mechanism is disposed in the connecting rod accommodating cavity, a press plate corresponding to one end of the clamping connecting rod mechanism extends into the pipe expanding cavity, and the other end of the clamping connecting rod mechanism is connected with a linkage wrench extending out of the pipe expander body. Through the arrangement of the connecting rod accommodating cavity with the connecting rod mechanism on the pipe expander body, the press plate at one end of the connecting rod mechanism tightly presses a side wall of the chuck body onto an annular wall surface of the pipe expanding cavity for peripheral fixation, the other end of the connecting rod mechanism is further provided with the linkage wrench, the linkage wrench extends out of the pipe expander body, the linkage wrench is pulled during clamping positioning, the connecting rod mechanism can drive the press plate to tightly clamp the chuck body, the operation is convenient, and time and labor are saved. At the same time, the linkage wrench can trigger a relevant action switch on the system, such as starting or instant stop, and the automation and intelligence of the pipe expanding processing are realized.

More preferably, an adjusting screw is screwed and connected onto the pipe expander body, the connecting rod mechanism is driven when the adjusting screw screws in, and the press plate is in butt joint with the side wall of the chuck body in a tightly clamping manner. Through the arrangement of the adjusting screw at the other end of the connecting rod mechanism, when the chuck body is abraded, the adjusting screw can be screwed into the connecting rod accommodating cavity, the adjusting screw drives the connecting rod mechanism to move, and then, the press plate on the connecting rod mechanism tightly presses the chuck body so that the chuck body is precisely and tightly clamped between the press plate and an inner wall surface of the pipe expanding cavity. The pressure for locking the chuck body can be freely adjusted, at the same time, a mechanism assembly error and an error caused by use abrasion are compensated, the structure is simple, the service life of the pipe expander is prolonged, and the pipe expanding processing quality is guaranteed.

More preferably, an end portion of the press plate corresponding to the chuck body horizontally and outwards extends to form a trapezoidal press head, a trapezoidal clamping opening is formed in a side wall of the chuck body corresponding to the trapezoidal press head, and when the press plate tightly clamps the chuck body, the press plate is in butt joint with a bottom surface of the trapezoidal clamping opening through a bottom edge of the trapezoidal press head, and is in butt joint with a bevel edge at a lower part of the trapezoidal clamping opening through a bevel edge at a lower part of the trapezoidal press head. The press plate tightly clamps after the trapezoidal press head is fit with the corresponding trapezoidal clamping opening on the chuck body, additionally, the bevel edge at the lower part of the trapezoidal press head is in butt joint with the bevel edge at the lower part of the trapezoidal clamping opening, the lower bevel edges of the trapezoidal press head and the trapezoidal clamping opening outwards and downwards extend, so that clamping force can be formed in a horizontal direction and a vertical direction when the trapezoidal press head and the trapezoidal clamping opening are tightly pressed in a fit manner, and the chuck body is enabled to be firmly fixed in the pipe expanding cavity. At the same time, due to the trapezoidal structure, a press-in end of the trapezoidal press head is in plane transition, on one hand, the trapezoidal press head can conveniently slide into the trapezoidal clamping opening, on the other hand, sharp corner scratching injury is prevented, and the use safety is improved.

More preferably, a horizontal position limiting post is disposed on the pipe expanding cavity opposite to the press plate on the clamping connecting rod mechanism, and a mutually matched horizontal through groove is formed in a side wall of the chuck body corresponding to the horizontal position limiting post. The other side of the chuck body is positioned through the mutually matched horizontal through groove and horizontal position limiting post, and the positioning accuracy of the chuck body is guaranteed.

More preferably, a pressing end of the clamping connecting rod mechanism is in butt joint with a side wall of a rotating shaft far away from the chuck body, and maintains sliding connection with a side wall surface of the chuck body. The pressing position of the connecting rod mechanism is downwards moved to the end portion far away from the rotating shaft, in the pressing process, the pressing end of the connecting rod mechanism maintains sliding connection with the side wall surface of the chuck body, so that the pressing force from the connecting rod mechanism totally acts on a chuck, the pipe to be processed is firmly clamped and fixed into the positioning hole of the chuck body, the pressing force has no component force in a vertical direction, and the use efficiency of the pressing force is improved. At the same time, a stress point of the chuck body is far away from the rotating shaft, a lever force arm is longer, the clamping force of the pipe to be processed is increased, and the clamping effect is enhanced. Therefore, the pipe expanding processing quality is better guaranteed.

Preferably, a plastic casing covers an outside of the pipe expander body, the plastic casing extends outwards to form a motor accommodating cavity, a motor is disposed in the motor accommodating cavity, an output shaft end of the motor is connected with the worm gear and worm mechanism, and the other end of the motor is electrically connected with a rechargeable battery. The whole machine uses the plastic casing, so that an internal circuit is completely isolated from an external environment, and the safety is high. At the same time, the plastic has good heat insulation performance, and a hot-to-handle risk cannot occur after long-time continuous use.

More preferably, the rechargeable battery includes a battery pack disposed in a battery pack accommodating cavity on the pipe expander body. An ID detection port, a voltage detection port and a temperature detection port are disposed on a protective case of the battery pack, and the ID detection port, the voltage detection port and the temperature detection port are all connected to a battery cell in the protective case through a battery circuit board. The ID detection port, the voltage detection port and the temperature detection port are disposed on the rechargeable battery, through the ID detection port, the influence on the use performance of the electric pipe expander due to use of batteries of other brands in the electric pipe expander is avoided, and the use safety of the electric pipe expander is guaranteed. Through the voltage detection port, the charging and discharging voltage of the battery can be detected, and charging and discharging protection is further achieved. Through the temperature detection port, the battery temperature can be monitored in real time, safety accidents caused by battery overheat and the like are prevented. The whole structure is simple, the safety and reliability are high, and the service lives of the battery and the electric pipe expander are guaranteed.

Preferably, the chuck body includes a left clamp body and a right clamp body, middle portions of the left clamp body and the right clamp body are rotationally connected onto a rotating shaft, the corresponding left clamp body and right clamp body at one side of the rotating shaft form a clamping end for clamping the pipe to be processed, and the corresponding left clamp body and right clamp body at the other side of the rotating shaft respectively form force application handles. The pipe to be processed is clamped and fixed through the chuck body of a scissor-like structure, the positioning is reliable, and the mounting and dismounting are convenient.

More preferably, a positioning bulge and a positioning groove matched with each other are disposed between matching surfaces of the left clamp body and the right clamp body. Through the arrangement of the positioning bulge and the positioning groove which are matched with each other between the matching surfaces at the outer sides of the left clamp body and the right clamp body, when the pipe to be processed is in a clamped state, the positioning bulge is inserted into the positioning groove for positioning, thus preventing the occurrence of axial staggering of the left and right clamp bodies and preventing the influence on the pipe expanding processing precision.

Preferably, an end surface baffle plate is rotationally connected onto an end surface of the chuck body adjacent to the pipe expanding cone, and an end surface of the pipe to be processed is in butt joint with a corresponding outer side surface of an inner side end of the end surface baffle plate. Through the arrangement of the end surface baffle plate on the inner side end surface of the chuck body, the axial position of the pipe to be processed can be precisely positioned, so as to guarantee the pipe expanding processing quality.

Preferably, the end surface baffle plate is movably sleeved on a pin sleeve, the pin sleeve is screwed, connected and fixed to an end portion of a rotating shaft of the chuck body through a threaded connecting component in close fit, an outer ring surface of the pin sleeve outwards extends along an outer end surface of the end surface baffle plate to form an end surface baffle ring, and the end surface baffle plate is movably clamped between the end surface baffle ring and an end surface of the chuck body. The end portion of the rotating shaft is coaxially screwed, connected and fixed with the pin sleeve with the end surface baffle ring through the threaded connecting component, the end surface baffle plate is sleeved on the pin shaft so that the end surface baffle plate is clamped between the end surface baffle ring and the end surface of the chuck body. During installation, a gap of the end surface baffle plate can be firstly adjusted by rotating the pin sleeve, and then, the threaded connecting component is screwed and fixed onto the pin sleeve so as to be in close fit with the pin sleeve to avoid the increase of the gap of the end surface baffle plate caused by the looseness of the pin sleeve generated in the use process, the structure is simple, the gap of the end surface baffle plate can be conveniently adjusted and precisely controlled, and the pipe expanding processing quality is guaranteed.

More preferably, the pin sleeve extends into an installing hole of the chuck body, and a chuck body reset torsional spring is sleeved outside the corresponding pin sleeve in the installing hole. The chuck body reset torsional spring is configured to reset the left and right chuck bodies after the pipe to be processed is unclamped.

An intelligent control circuit for an electric pipe expander includes a single chip microcomputer unit, a mandrel stroke detection unit, a wrench position detection unit, a motor driving unit and a power supply unit for providing work voltage for the whole intelligent control circuit for the electric pipe expander. The mandrel stroke detection unit, the wrench position detection unit and the motor driving unit are respectively connected to the single chip microcomputer unit. The mandrel stroke detection unit detects whether a pipe expanding head advances to exceed an allowable range or not (if YES, damage of the pipe expander may be caused), and also detects whether the pipe expending head retreats to an initial position before starting or not. The wrench position detection unit detects whether a wrench on the pipe expander is in a closed locked state or an open state, detection signals are respectively sent to the single chip microcomputer unit, the single chip microcomputer unit gives a corresponding control signal to the motor driving unit according to the detected conditions to control the motor to positively rotate, reversely rotate or stop rotating, and the automatic control of the pipe expanding head is achieved. According to the technical solution, the pipe expanding process is controlled in the whole process, whether the pipe expansion is completed or not or whether the retreating is in place or not after the pipe expansion and the rotation of the motor are automatically completed through the control circuit, the influence on the pipe expansion caused by artificial factors is avoided, the pipe expansion reliability is improved, the time and labor are saved, and the whole-process automatic operation is realized.

Preferably, the mandrel stroke detection unit includes a pipe expanding head advancing position limiting switch J3 and a pipe expanding head retreating position detection switch J5. One pin of the pipe expanding head advancing position limiting switch J3 is grounded, and the other pin of the pipe expanding head advancing position limiting switch J3 is connected to the single chip microcomputer unit through a resistor R23. One pin of the pipe expanding head retreating position detection switch J5 is grounded, and the other pin of the pipe expanding head retreating position detection switch J5 is connected to the single chip microcomputer unit through a resistor R25. When the motor positively rotates, and the pipe expanding head advances for working, the pipe expanding head retreating position detection switch J5 is in an off state. After the work of the pipe expanding head is completed, the motor reversely rotates, the pipe expanding head retreats back to the initial position before starting, and the pipe expanding head retreating position detection switch J5 is in an on state. At this moment, a single chip microcomputer gives out a signal to control the motor to stop working. That is, the single chip microcomputer determines whether the pipe expanding head returns to the initial position or not by detecting whether the pipe expanding head retreating position detection switch J5 is in in on state or not. If the pipe expanding head retreating position detection switch J5 is in the on state, it shows that the pipe expending head has returned to the initial position, and the motor stops rotating. The pipe expanding head advancing position limiting switch J3 is in a normally off state, when the pipe expanding head advances to exceed the allowable range (damage of the pipe expander may be caused), the pipe expanding head advancing position limiting switch J3 is switched on, and at this moment, the single chip microcomputer immediately gives out a signal to control the motor to reversely rotate, so that the pipe expanding head retreats to return to the initial position before starting. The effect is to avoid the occurrence of a machine damage phenomenon caused when an operator starts the pipe expander by mistake before the chuck is installed.

Preferably, the wrench position detection unit includes a wrench position detection switch J4, one pin of the wrench position detection switch J4 is grounded, and the other pin of the wrench position detection switch J4 is connected to the single chip microcomputer unit through a resistor R24. When the wrench is in a closed locking position, the wrench position detection switch J4 is switched on, the pipe expander can be started to work. When the mandrel motor positively rotates, if the wrench is opened, then the wrench position detection switch J4 is switched off, the single chip microcomputer can control the motor to immediately rotate reversely, and the pipe expanding head retreats to the initial position before starting. The starting by mistake under the wrench opening condition is avoided.

Preferably, the intelligent control circuit for the electric pipe expander includes a motor current acquisition unit. The motor current acquisition unit includes an operational amplifier U1B, an inverted phase input end and an in-phase input end of the operational amplifier U1B are respectively connected to two ends of a current sampling resistor disposed in the motor driving unit through a resistor R13 and a resistor R18, the inverted phase input end of the operational amplifier U1B is connected to an output end of the operational amplifier U1B through a resistor R8, the in-phase input end of the operational amplifier U1B is grounded through a capacitor C6 and is connected to a voltage 3.3V_A through a resistor R20, the output end of the operational amplifier U1B is grounded through a series circuit of a resistor R15 and a capacitor C5, and a connecting point of the resistor R15 and the capacitor C5 is connected to the single chip microcomputer unit. The motor current acquisition unit detects work current of the motor, and transmits the result to the single chip microcomputer. When a set value is exceeded, the single chip microcomputer can control the motor to stop rotating, and the machine is prevented from burn damage.

Preferably, the intelligent control circuit for the electric pipe expander includes a motor short circuit protection unit. The motor short circuit protection unit includes an operational amplifier U1A, an inverted phase input end of the operational amplifier U1A is connected to the motor driving unit through a resistor R10, an in-phase input end of the operational amplifier U1A is connected to a voltage 3.3V_A through a resistor R16 and is grounded through a resistor R19, one path of an output end of the operational amplifier U1A is connected to a voltage 3.3V_A through a resistor R11, and the other path of the output end of the operational amplifier U1A is connected to the single chip microcomputer unit through a resistor R14. The motor short circuit protection unit detects whether the motor generates a short circuit or not, once the short circuit is detected, the single chip microcomputer immediately controls the motor to stop rotating, and a protection effect is achieved on the motor and the pipe expander.

Preferably, electric power of the power supply unit is supplied by a battery, the intelligent control circuit for the electric pipe expander includes a battery voltage detection unit and a battery level indicating unit. The battery voltage detection unit includes a resistor R9 and a resistor R17, one end of the resistor R9 is connected to a positive electrode of the battery, the other end of the resistor R9 is grounded through the resistor R17, a capacitor C4 is connected in parallel onto the resistor R17, and a connecting point of the resistor R9 and the resistor R17 is connected to the single chip microcomputer unit through a resistor R12. The battery level indicating unit includes light emitting diodes D11 to D14 arranged into a row, negative electrodes of the light emitting diodes D11 to D14 are all grounded, and positive electrodes of the light emitting diodes D11 to D14 are respectively connected to the single chip microcomputer unit through a resistor R1, a resistor R2, a resistor R5 and a resistor R6. The battery voltage detection unit detects the battery level, and transmits the result to the single chip microcomputer, the single chip microcomputer outputs a signal to control the on-off state of battery level indicating lamps consisting of the four light emitting diodes, the battery level is indicated by the number of on/off light emitting diodes of the four light emitting diodes arranged into a row, so that the battery can be timely replaced, and the normal work of the pipe expander is guaranteed.

Preferably, the intelligent control circuit for the electric pipe expander includes a battery temperature detection unit. The battery temperature detection unit includes a thermistor disposed on the battery, one end of the thermistor is grounded, the other end of the thermistor is connected to a voltage 3.3V_D through a resistor R21, and a connecting point of the thermistor and the resistor R21 is connected to the single chip microcomputer unit through a resistor R22. The battery temperature detection unit detects the temperature of a battery pack, and transmits the result to the single chip microcomputer, when the temperature exceeds a set value, the single chip microcomputer controls the motor to stop rotating, and an overtemperature protection effect is achieved.

Preferably, the power supply unit includes a power supply conversion circuit and a main power supply switch circuit, the main power supply switch circuit includes an illumination switch S1 and a wake-up switch J6, one end of the illumination switch S1 is grounded, the other end of the illumination switch S1 is connected to negative electrodes of a diode D1 and a diode D3, a positive electrode of the diode D1 is connected to a voltage 3.3V_D through a resistor R28 and is connected to the single chip microcomputer unit, a positive electrode of the diode D3 is connected to a positive electrode of a diode D4, a negative electrode of the diode D4 is connected to one end of the wake-up switch J6 and is connected to a negative electrode of a diode D2, the other end of the wake-up switch J6 is grounded, a positive electrode of the diode D2 is connected to a voltage 3.3V_D through a resistor R29 and is connected to the single chip microcomputer unit, the positive electrode of the diode D3 is connected to a collecting electrode of a triode Q2 through a magnetic bead FB3, an emitting electrode of the triode Q2 is grounded, a base electrode of the triode Q2 is connected to the single chip microcomputer unit through a resistor R31 and is grounded through a resistor R32, the collecting electrode of the triode Q2 is connected to a base electrode of a triode Q1 through a resistor R30, a resistor R27 is connected between the base electrode of the triode Q1 and an emitting electrode of the triode Q1, the emitting electrode of the triode Q1 is connected to a voltage VCC, and a collecting electrode of the triode Q1 is connected to a voltage 7.2 V. An illumination lamp is disposed on the pipe expander, a positive electrode of the illumination lamp is connected to the single chip microcomputer unit through a resistor R3, and a negative electrode of the illumination lamp is grounded. The illumination switch S1 controls the on-off state of the illumination lamp connected onto an interface J2. The illumination lamp is configured to illuminate a peripheral environment when the pipe expander is used and to enable an operator to be able to do pipe expanding work in a dark environment. The wake-up switch J6 is configured to wake up the whole control circuit, and the pipe expander can work only after the control circuit is woke up.

Preferably, the intelligent control circuit for the electric pipe expander includes a light emitting diode D15 as a motor work indicating lamp. A positive electrode of the light emitting diode D15 is connected to the single chip microcomputer unit through a resistor R7, and a negative electrode of the light emitting diode D15 is grounded. The motor work indicating lamp indicates the operation of the motor. The illumination lamp is on when the motor rotates, and the illumination lamp is off when the motor stops rotating.

Therefore, the electric pipe expander of the present invention has the following advantages. A worm gear and worm transmission structure with a simple structure is used. Compared with those of an existing electric pipe expander, the whole machine length is reduced by about 25%, and the weight is reduced by about 34%. A chip is used for controlling the pipe expanding process in the whole process. The automatic pipe expansion is realized after one-key starting. The automatic resetting is realized after the pipe expansion is completed. The time and the labor are saved, and the operation is convenient. The pipe to be processed is installed and clamped by the clamping connecting rod mechanism, the time and the labor are saved during the installation and clamping, and convenience and high speed are realized. In the processing period, the elastic body decelerates the axial moving speed of the mandrel through self deformation, and the single cycle axial deformation amount of the pipe socket is decreased, so that a peripheral shape of a pipe socket becomes uniform, and the processing quality of the pipe socket is effectively guaranteed. A mechanism assembly error and an error caused by use abrasion are compensated by the adjusting screw on the clamping connecting rod mechanism, so that the service life of the pipe expander is prolonged, and the pipe expanding processing quality is guaranteed.

DETAILED DESCRIPTION

The technical solution of the present invention is further specifically described in combination of the following embodiments and the accompanying drawings.

Embodiment 1

Figure 1:
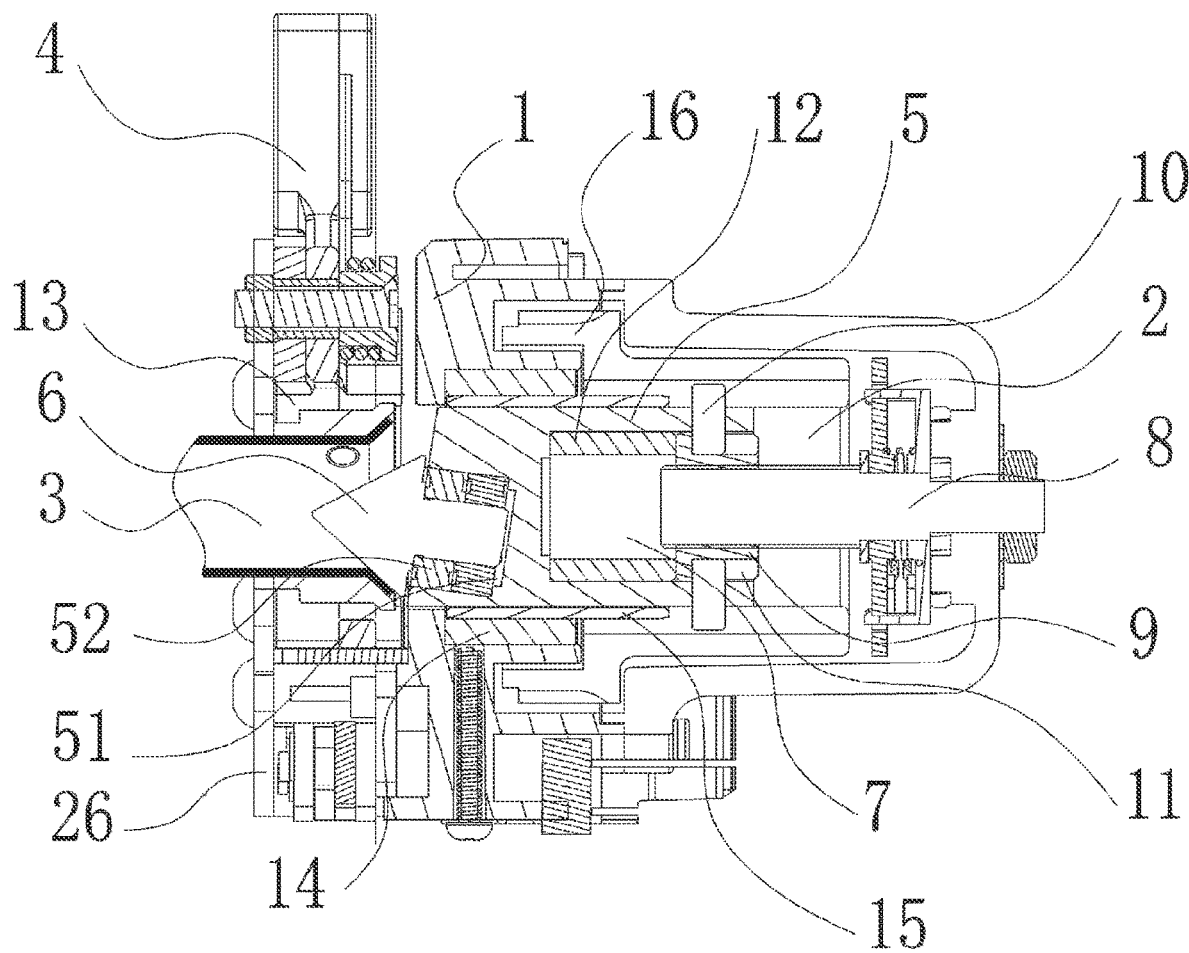
FIG. 1 is a schematic local structure diagram of an electric pipe expander of the present invention.
Figure 3:
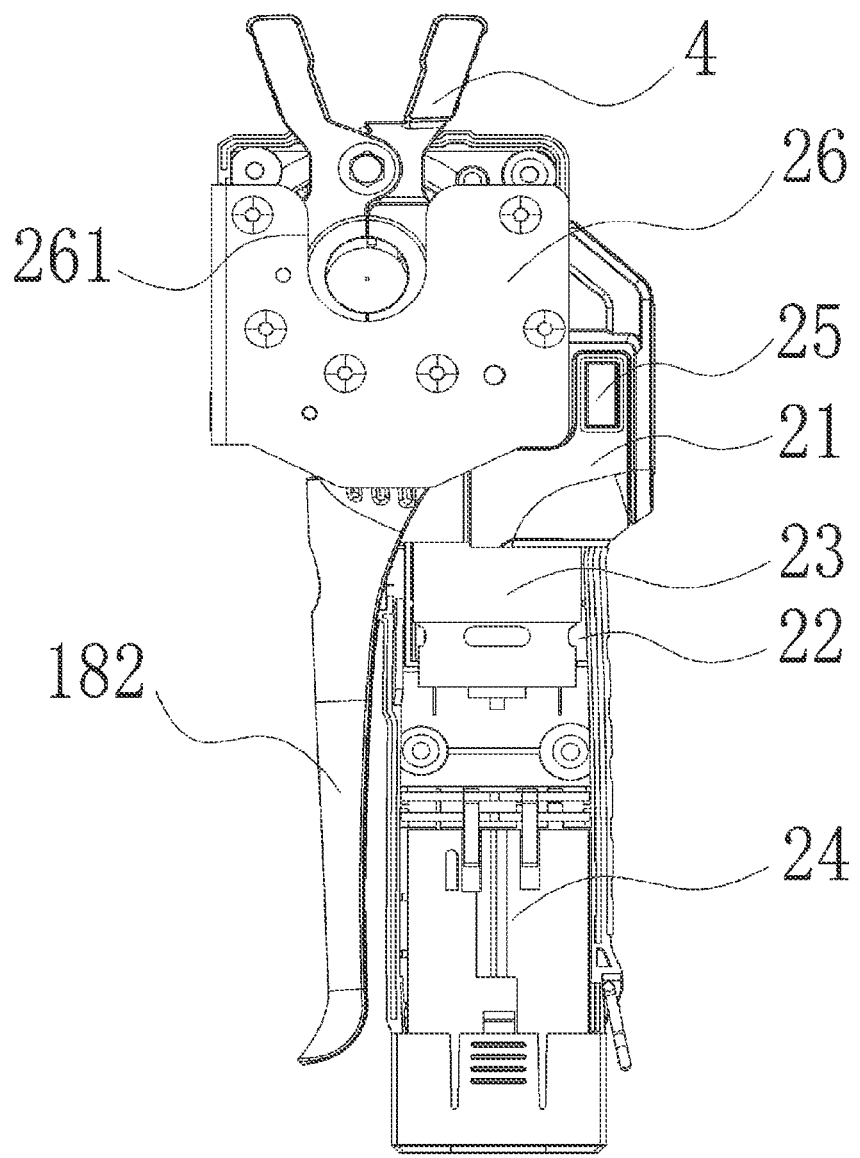
FIG. 3 is a schematic structure diagram of the present invention.
Figure 5:
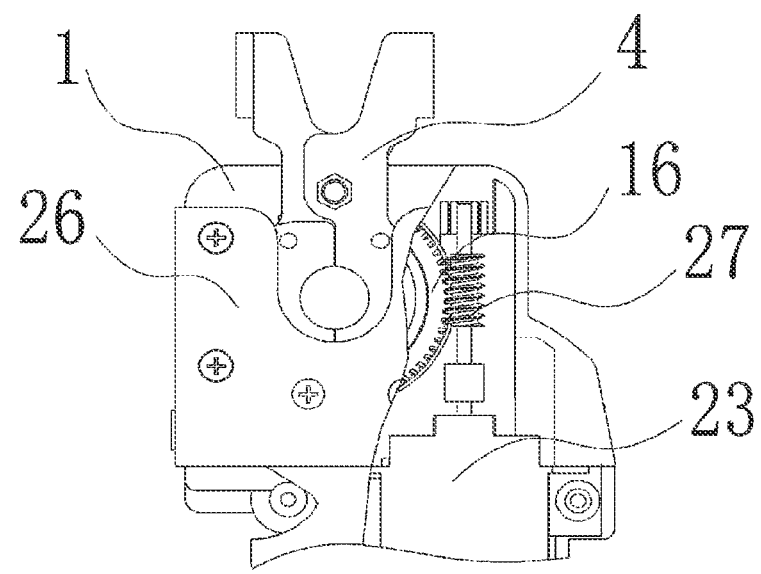
FIG. 5 is a schematic local structure diagram of the present invention.

As shown in FIG. 3 and FIG. 5, an electric pipe expander of the present invention includes a pipe expander body 1. A plastic casing 21 is disposed outside the pipe expander body 1 in a covering manner, and the plastic casing 21 extends downwards to form a long-strip-shaped motor accommodating cavity 22. A rechargeable battery 24, a motor 23 and a worm gear and worm mechanism are sequentially disposed in the motor accommodating cavity 22 from bottom to top, an output shaft end of the motor 23 is coaxially connected onto a worm 27 of the worm gear and worm mechanism, and the other end of the motor 23 is electrically connected to the rechargeable battery 24. As shown in FIG. 1, a mandrel sliding cavity 2 is disposed on the pipe expander body 1 corresponding to a worm gear 16 of the worm gear and worm mechanism, the mandrel sliding cavity 2 is coaxial with the worm gear 16 and extends into a middle hole of the worm gear 16, a chuck body 4 capable of clamping a pipe to be processed 3 is disposed at an opening end of the mandrel sliding cavity 2, a mandrel 5 made of a plastic material is slidingly connected in the mandrel sliding cavity 2, an outer side end surface of the mandrel 5 corresponding to the chuck body 4 is an inclined plane, a cone positioning hole 51 is vertically formed in a middle portion of the inclined plane, an included angle of 8° is formed between an axial line of the cone positioning hole 51 and an axial line of the mandrel 5, a pipe expanding cone 6 is disposed in the cone positioning hole 51, and a connecting end of the pipe expanding cone 6 is rotationally connected in the cone positioning hole 51 through a cone bearing 52. A middle portion of an inner side end of the mandrel 5 opposite to the pipe expanding cone 6 is provided with an elastic body accommodating cavity 7, a guide screw rod 8 is coaxially fixed onto the pipe expander body 1 corresponding to an opening end of the elastic body accommodating cavity 7, an outer side end of the guide screw rod 8 extends out of the pipe expander body 1 and is tightly locked through a screw nut, an inner side end of the guide screw rod 8 extends into a middle hole of the elastic body accommodating cavity 7, a transmission screw nut 9 made of a metal material is screwed and connected onto the corresponding guide screw rod 8 in the middle hole of the elastic body accommodating cavity 7, two axial key slots 11 are symmetrically formed in the transmission screw nut 9, and back side ends of the two axial key slots 11 communicate with a rear end surface of the transmission screw nut 9.

Figure 2:
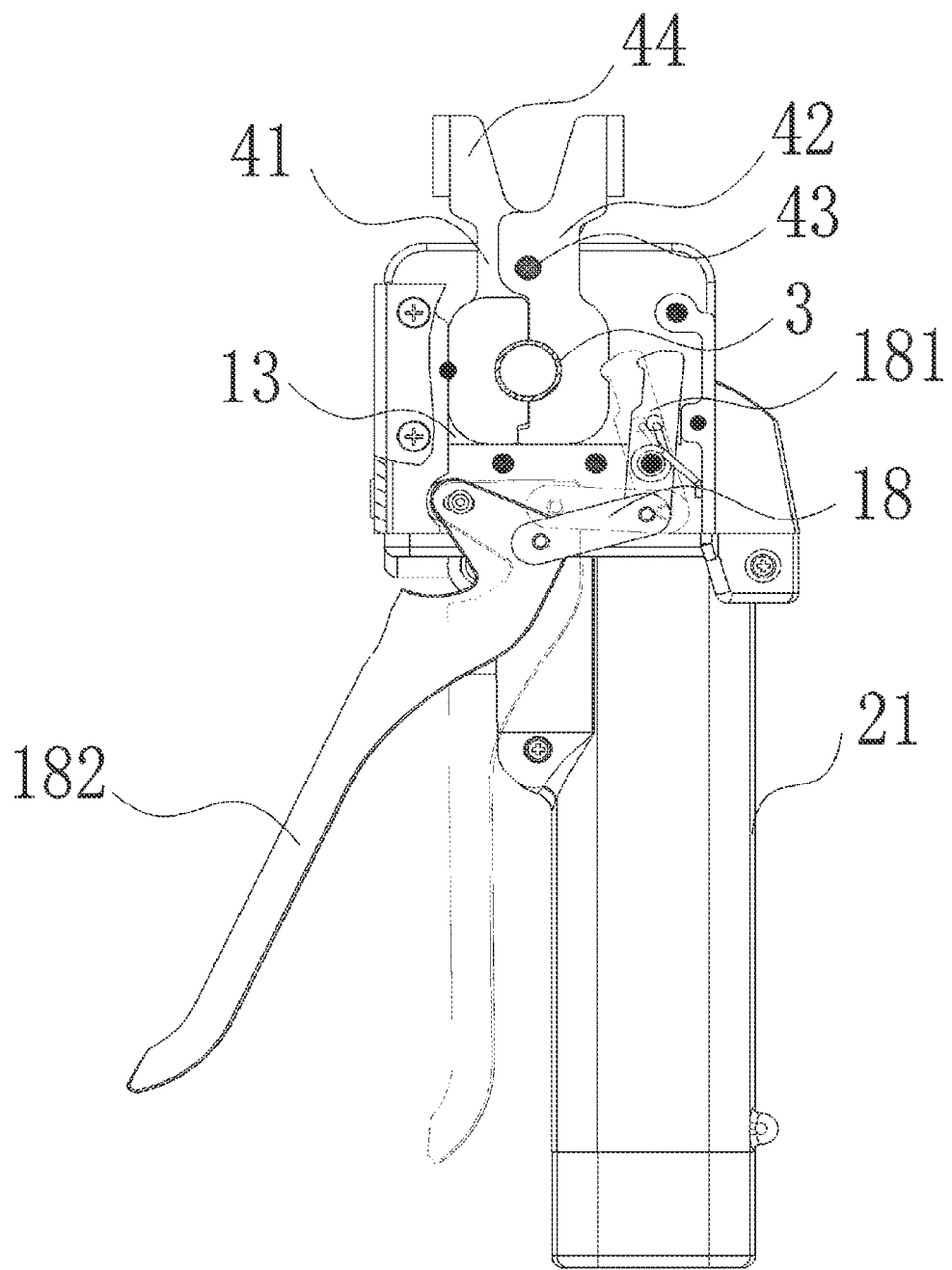
FIG. 2 is a schematic structure diagram of the present invention after a baffle plate is dismounted.
Figure 4:
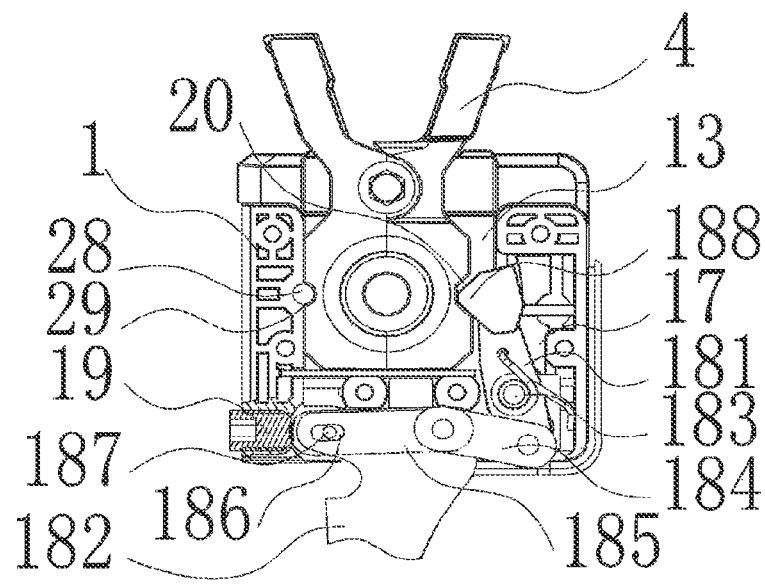
FIG. 4 is a schematic local structure diagram of the present invention in a first implementation.
Figure 6:
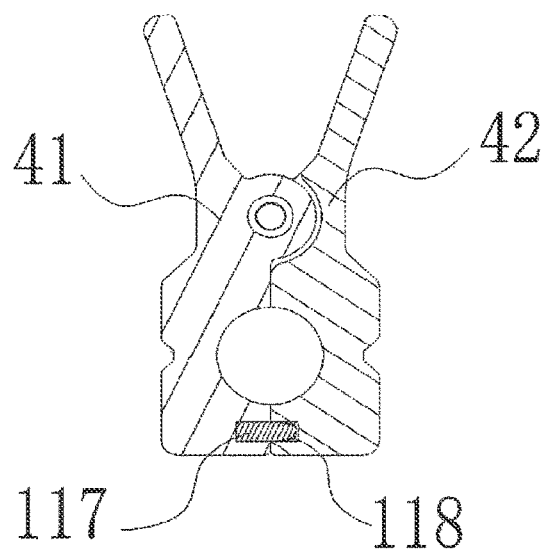
FIG. 6 is a schematic structure diagram of a chuck body of the present invention.

Two flat keys 10 are alternately fixed onto the mandrel 5 near the end opening of the elastic body accommodating cavity 7. In order to reduce friction and weight, each of the flat keys 10 is in a cylindrical shape, outer side ends of the flat keys 10 are slidingly connected into corresponding axial through grooves in the middle hole of the worm gear 16 in an axial direction, and inner side ends of the flat keys 10 are slidingly connected into the corresponding axial key slots 11 in the transmission screw nut 9. An elastic body 12 made of a rubber material is clamped and disposed between the flat keys 10 and a bottom surface of the elastic body accommodating cavity 7. The elastic body 12 is in an annular shape. The inner side end of the guide screw rod 8 can extend into a middle hole of the elastic body 12. A mandrel bearing 14 is coaxially embedded and fixed in the pipe expander body 1 corresponding to an outer side end of the mandrel 5, a support ring 15 is clamped and disposed between a middle hole of the mandrel bearing 14 and an outer ring surface of the mandrel 5, and an inner end of the support ring 15 extends out of the mandrel bearing 14 and then enters a corresponding annular groove in the middle hole of the worm gear 16. The support ring 15 maintains close fit with the annular groove. A pipe expanding cavity 13 is formed in the pipe expander body 1 corresponding to the chuck body 4, the pipe expanding cavity 13 is defined by a U-shaped baffle plate 26, the U-shaped baffle plate 26 is fixed onto the pipe expander body 1 with an opening end facing the mandrel 5, and a lower end opening of the baffle plate 26 faces one end of the motor accommodating cavity 22. A pipe guide-in notch 261 is formed in the middle portion of the bottom surface corresponding to the upper end opening of the baffle plate 26, the clamping end of the chuck body 4 downwards enters the pipe expanding cavity 13 from the upper end opening of the baffle plate 26, two side surfaces of the chuck body 4 entering the pipe expanding cavity 13 are clamped and fixed through a clamping connecting rod mechanism 18, and an outer end surface is parallelly in butt joint with the bottom surface of the U-shaped baffle plate 26. As shown in FIG. 2 and FIG. 4, a connecting rod accommodating cavity 17 is formed in the pipe expander body 1 corresponding to the periphery of the pipe expanding cavity 13, the connecting rod accommodating cavity 17 is in an L shape, a transverse edge of the L shape is horizontally positioned under the pipe expanding cavity 13 and communicates with the left side end of the pipe expander body 1, and a longitudinal edge of the L shape is upward along the right side of the pipe expanding cavity 13 and communicates with the pipe expanding cavity 13. The clamping connecting rod mechanism 18 is positioned in the connecting rod accommodating cavity 17, the connecting rod mechanism 18 includes a press plate 181 rotationally connected onto an inner wall of the connecting rod accommodating cavity 17 through a first fixing pin 183, the first fixing pin 183 is positioned in a longitudinal edge cavity near a transverse edge cavity of the connecting rod accommodating cavity 17, an upper end of the press plate 181 extends into the pipe expanding cavity 13, and a lower end of the press plate 181 is rotationally connected to one end of a connecting plate 184. The other end of the connecting plate 184 is rotationally connected to one end of a horizontal sliding plate 185, the connecting plate 184 and the horizontal sliding plate 185 are both positioned in a cavity corresponding to the transverse edge of the connecting rod accommodating cavity 17, an outer side end of the horizontal sliding plate 185 is near a left end opening of the connecting rod accommodating cavity 17, an adjusting screw 19 is screwed and connected in a left side end opening, and an inner side end of the adjusting screw 19 is in butt joint with the outer side end of the horizontal sliding plate 185. A second fixing pin 187 is fixed onto the inner wall of the connecting rod accommodating cavity 17 near the adjusting screw 19, the second fixing pin 187 is parallel to the first fixing pin 183, a horizontal slotted hole 186 is formed in the horizontal sliding plate 185, the horizontal sliding plate 185 is glidingly connected onto the second fixing pin 187 through the horizontal slotted hole 186, the connecting rod mechanism 18 is driven when the adjusting screw 19 is screwed in, and the press plate 181 is in butt joint with the side wall of the chuck body 4 in a tightly clamping manner. One end of a linkage wrench 182 is also connected between a connecting shaft of the connecting plate 184 and the horizontal sliding plate 185 and the second fixing pin 187, the other end of the linkage wrench 182 extends out of the pipe expander body 1 in a manner of being opposite to the pipe guide-in notch 261, and additionally, an outer side end of the linkage wrench is near the motor accommodating cavity 22. The end portion of the press plate 181 corresponding to the chuck body 4 horizontally and outwards extends to form an integrally connected trapezoidal press head 188. A small bottom surface end of the trapezoidal press head 188 is pointed to the chuck body 4, an included angle formed between a lower side bevel edge of the trapezoidal press head 188 and a big bottom surface is 45°, and a trapezoidal clamping opening 20 is formed in the side wall of the chuck body 4 corresponding to the trapezoidal press head 188. When the press plate 181 tightly clamps the chuck body 4, the press plate 181 is in butt joint with a bottom surface of the trapezoidal clamping opening 20 through a bottom edge of the trapezoidal press head 188, and is in butt joint with a bevel edge at the lower part of the trapezoidal clamping opening 20 through a bevel edge at the lower part of the trapezoidal press head 188, and a gap is formed between a bevel edge at the upper part of the trapezoidal press head 188 and a bevel edge at the upper part of the trapezoidal clamping opening 20. A horizontal position limiting post 28 is fixed onto an inner wall of the pipe expanding cavity 13 opposite to the press plate 181, the horizontal position limiting post 28 keeps parallel with the second fixing pin 187 and the first fixing pin 183, and mutually matched horizontal through grooves 29 are formed in the side walls of the chuck body 4 corresponding to the horizontal position limiting post 28. In order to prevent the abrasion of the press plate 181 and the chuck body 4, the press plate 181 is externally provided with a plastic protective sleeve, and the plastic protective sleeve is processed through injection molding. The chuck body 4 includes a left clamp body 41 and a right clamp body 42 in symmetrical arrangement, and middle portions of the left clamp body 41 and the right clamp body 42 are rotationally connected onto a rotating shaft 43. In order to reduce the weight under the condition of ensuring the strength, a high-strength plastic shell respectively covers each of the left clamp body 41 and the right clamp body 42, semicircular notches for clamping the pipe to be processed 3 are respectively formed in the left clamp body 41 and the right clamp body 42 corresponding to the clamping end, the trapezoidal clamping opening 20 is respectively positioned on the outer side walls of the left clamp body 41 and the right clamp body 42 opposite to the semicircular notches, the left clamp body 41 and the right clamp body 42 opposite to the clamping end respectively form force application handles 44, and the force application handles 44 are positioned outside the pipe expanding cavity 13. As shown in FIG. 6, during processing, in order to prevent the left clamp body 41 and the right clamp body 42 to generate axial staggering, a positioning bulge 117 and a positioning groove 118 matched with each other are disposed between matching surfaces of the outer sides of the left clamp body 41 and the right clamp body 42. The positioning bulge 117 is a cylindrical pin provided with a flange and is vertically inserted, connected and fixed onto the matching surface of the left clamp body 41, and the positioning groove 118 is positioned on the corresponding matching surface of the right clamp body 42. In order that the positioning bulge 117 can be conveniently guided into the positioning groove 118, an insertion end of the cylindrical pin outwards and inwards extends to form a cone surface for easy guide-in. In order that the pipe expansion processing can be conveniently performed under the condition of poor light rays, an illumination lamp 25 is embedded and fixed onto the surface of the pipe expander body 1 near the baffle plate 26.

Figure 7:
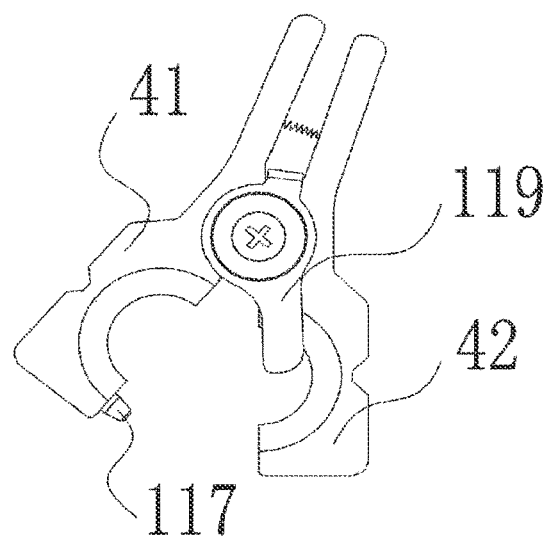
FIG. 7 is a schematic structure diagram of another chuck body of the present invention.

As shown in FIG. 7, a tongue-shaped end surface baffle plate 119 is rotationally connected onto the end surface of the chuck body 4 adjacent to the pipe expanding cone 6, a middle portion of the end surface baffle plate 119 is sleeved on a rotating shaft of the chuck body 4, an outer side end of the end surface baffle plate 119 is hooked between the left and right force application handles 44, and the width is the minimum distance formed between the two force application handles 44. During installation and clamping, the end surface of the pipe to be processed 3 is in butt joint with the side surface of the end surface baffle plate 119 so as to limit the axial position of the pipe to be processed 3.

Figure 8:
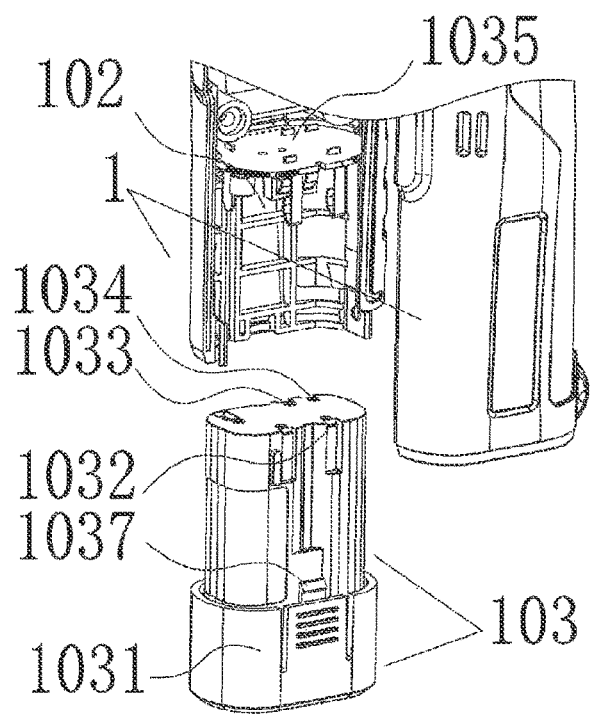
FIG. 8 is a schematic structure diagram of a rechargeable battery of the present invention.

As shown FIG. 8, a battery pack structure for an electric tube expander of the present invention includes the tube expander body 1. A battery pack 103 is installed in a battery pack accommodating cavity 102 at the bottom of the tube expander body 1. The battery pack 103 includes a barrel-shaped protective shell 1031 made of plastic material. The cross-section of the protective shell 1031 is oblate. A circuit board 1035 is installed in the cavity of the protective shell 1031. The outer protective shell 1031 is connected to the open end of the battery pack accommodating cavity 102, the inner end of the protective shell 1031 is mated and inserted in the battery pack accommodating cavity 102. A tab 1037 is provided with an inter-matching card slot to mate with the inner wall of the battery pack accommodating cavity 102 corresponding to the tab 1037. After the battery pack 103 is installed in place, the tab 1037 is mutually matched and clamped in the corresponding card slot and is connected to the tab 1037. Corresponding to the outer wall surface of the outer protective shell 1031 is provided with a number of transversely arranged protruding strips, in order to facilitate the installation of the battery, the inner wall surface of the inner end of the inner protective shell 1031 is provided with an introduction groove that matches the inner wall surface of the battery pack accommodating cavity. The protective shell 1031 of the battery pack 103 also has an ID detection port 1032, a voltage detection port 1033, and a temperature detection port 1034. The ID detection port 1032, the voltage detection port 1033 and the temperature detection port 1034 are all electrically connected through the battery circuit board 1035. The voltage detection port 1033 and the temperature detection port 1034 are respectively located on the side of the inner casing 1031 corresponding to the positive port of the battery pack, and the ID detection port 1032 is located opposite to the voltage detection port 1033 and the temperature detection port 1034 on the negative pole of the battery pack. The corresponding ports are on the side of the inner sheath 1031, and each port is connected to the inner end face of the inner sheath 1031. In order to facilitate the identification of each port, it is connected to the ID detection port 1032, the voltage detection port 1033, the temperature detection port 1034, and the positive and negative electrodes. The inner end surface of the inner protective shell 1031 corresponding to the port has a corresponding port identification mark.

Figure 11:
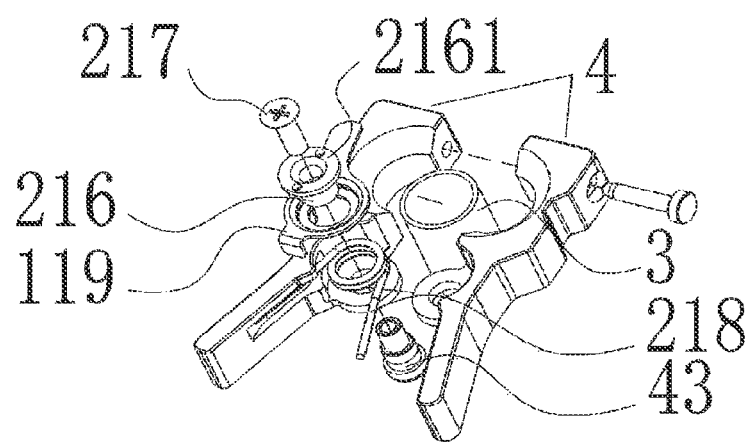
FIG. 11 is an exploded view of a chuck body of the present invention.
Figure 12:
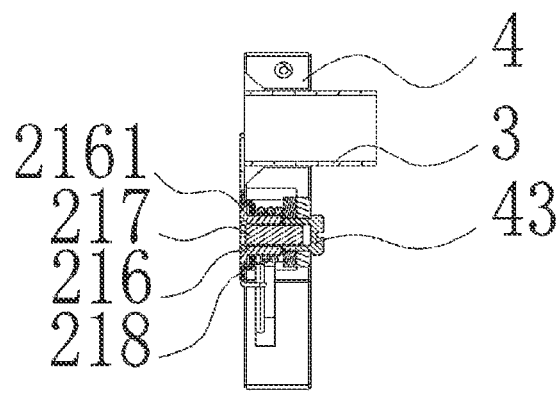
FIG. 12 is a cross-sectional view of FIG. 11.

As shown in FIG. 11 and FIG. 12, the end surface baffle plate 119 is rotationally sleeved on a pin sleeve 216, the other end of the pin sleeve 216 outwards extends along the outer end surface of the end surface baffle plate 119 to form an end surface baffle ring 2161, the end surface baffle ring 2161 is integrally formed with the pin sleeve 216, the end surface baffle ring 2161 is positioned in a groove formed in an edge of an installing hole of the end surface baffle plate 119, additionally, an outer end surface of the end surface baffle ring 2161 is flushed with an outer side surface of the end surface baffle plate 119, a threaded connecting component 217 is inserted and connected in a middle hole of the pin sleeve 216 in a mutual matching manner, the threaded connecting component 217 in the present embodiment is a flat screw, and the threaded connecting component 217 passes through the middle hole of the pin sleeve 216, and is then coaxially screwed in the middle hole in the end portion of the rotating shaft, so that the end surface baffle plate 119 is clamped between the end surface baffle ring 2161 and the end surface of the chuck body 4. After the pipe to be processed 3 is unclamped, in order that the left handle and the right handle of the chuck body 4 can be automatically reset, a chuck body reset torsional spring 218 is sleeved on the pin sleeve 216 corresponding to the outer side end of the end surface baffle plate 119, and two ends of the chuck body reset torsional spring 218 are respectively clamped in slotted grooves at the inner sides of the left and right handles of the chuck body 4. In order to ensure that the pin sleeve 216 cannot rotate relative to the rotating shaft when the threaded connecting component 217 is tightly screwed, and two baffle ring positioning holes for positioning are formed in the end surface of the end surface baffle ring 2161.

During use, the chuck body is in a closed state in a free state, one end of the force application handle of the chuck body is pinched by fingers to open for a certain angle, the pipe to be processed is placed in the position, the fingers are released after the end surface of the pipe to be processed is flushed with the end surface baffle plate at the outer side of the inner side end surface of the chuck body (a hole opening for clamping the pipe to be processed is in a cone shape), and the chuck body restores the closed state under the effect of a spring, and clamps the pipe to be processed. The linkage wrench is outwards pulled to an open state, then the chuck body clamping the pipe to be processed is put into the pipe expanding cavity of the pipe expander, and the linkage wrench is inwards pulled to a locked state. The adjusting screw is rotated, so that the press plate tightly presses the chuck body with a little interference, the press plate generates slight elastic deformation, the chuck body is tightly pressed by the elastic deformation force (when the pipe expanding processing is performed again, the adjusting screw does not need to be adjusted again, and the adjustment is performed after working for a period of time and under the condition that components of the mechanism are abraded). A starting switch on the pipe expander body is pressed down for pipe expanding processing, and the motor stops after shaping is completed. Then, the linkage wrench is pulled to an open state by gentle force, the chuck body is taken out, the force application handles of the chuck body are pinched by the fingers so that the clamping end of the force application handles opens for a certain angle, the pipe to be processed which has been processed is taken out, and the pipe expanding processing is completed.

In order to realize the intelligent processing of pipe expansion, an electronic control system is further disposed on the pipe expander. When the starting switch is switched on, the electronic control system can detect the position of the linkage wrench, and when the linkage wrench is in a locking position, the electronic control system can give out an instruction to control the motor to be started. In the working process, if detecting that the linkage wrench is open, the electronic control system can give out an instruction to make the motor drive the worm gear and worm mechanism to return the initial position before starting. In the pipe expanding process, with the gradual shaping of an expanded pipe socket, the output torque of the motor can be gradually increased, when a preset torque value is reached, the electronic control system can control the motor to reversely rotate, and when the mandrel and the transmission screw nut move to preset positions, a corresponding position switch is triggered, and the electronic control system gives out an instruction to make the motor stop working. If a user starts the starting switch under the condition of not placing the chuck body and performs adjustment control through a mandrel extending stroke control detection circuit, the detection circuit is respectively connected to the mandrel bearing and the guide screw rod, the worm gear and the mandrel are both made of insulation materials, and the detection circuit is a normally off circuit. When the mandrel continuously moves leftwards, the detection circuit is switched on at the moment that the flat keys are in contact with the support ring, the electronic control system gives out a motor reverse rotation instrument to control the mandrel to rightwards move, and the motor stops working until a position switch is triggered.

A chuck body detection switch can also be disposed at the side surface of the chuck body, and the chuck body detection switch is in a normally on state. When the chuck body is placed and locked, the detection switch switches on the detection circuit, the linkage wrench is in a locked state, and at this moment, the motor can be started to perform pipe expanding work by pressing down the starting switch.

Figure 13:
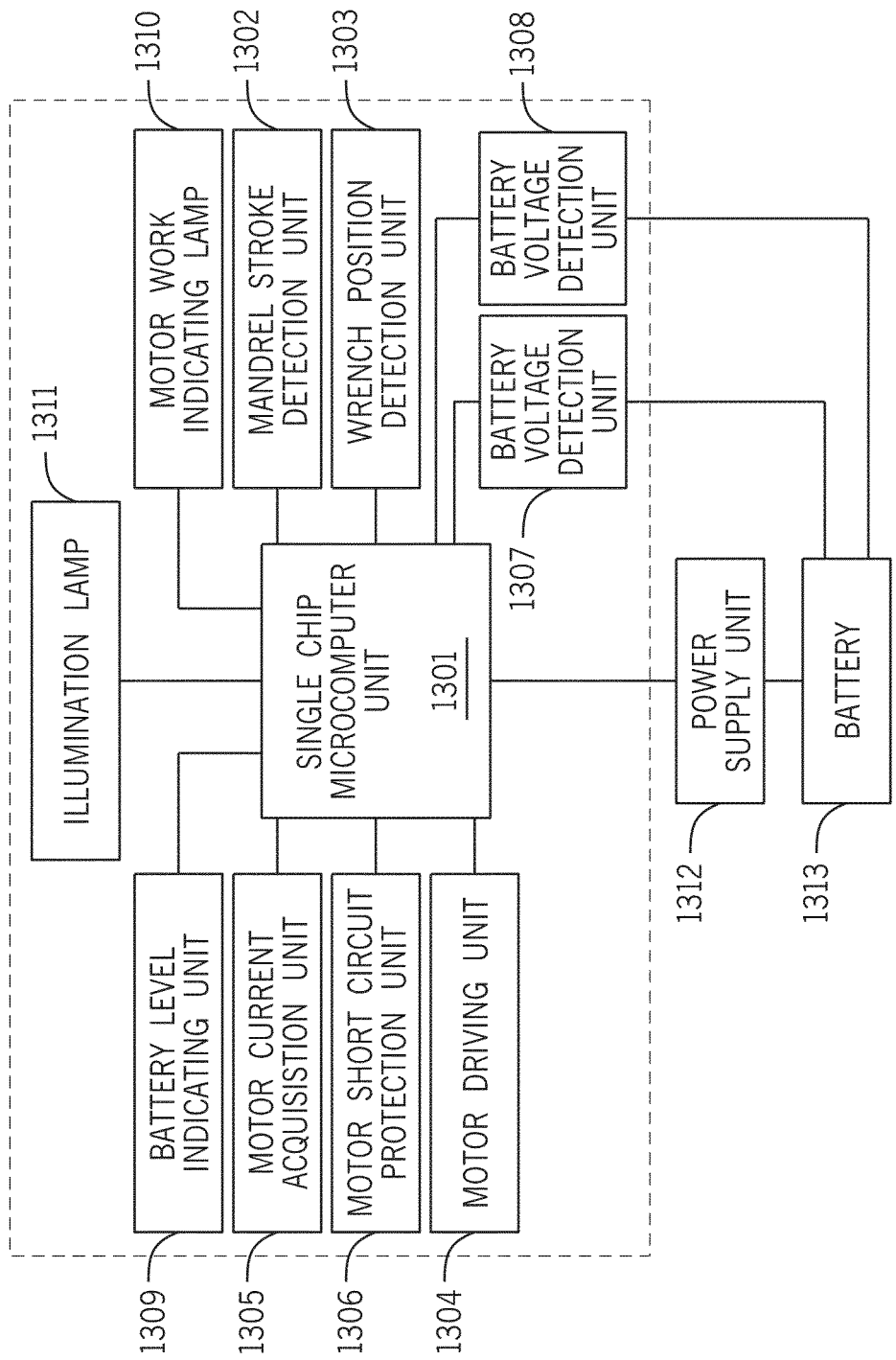
FIG. 13 is a block diagram of a circuit connection structure of the present invention.

An intelligent control circuit for an electric pipe expander according to the present invention, as shown in FIG. 13, includes a single chip microcomputer unit 1301, a mandrel stroke detection unit 1302, a wrench position detection unit 1303, a motor driving unit 1304, a motor current acquisition unit 1305, a motor short circuit protection unit 1306, a battery voltage detection unit 1307, a battery temperature detection unit 1308, a battery level indicating unit 1309, a motor work indicating lamp 1310, an illumination lamp 1311 and a power supply unit 1312 coupled to a battery 1313 for providing work voltage for the whole intelligent control circuit for the electric pipe expander. The mandrel stroke detection unit, the wrench position detection unit, the motor driving unit, the motor current acquisition unit, the motor short circuit protection unit, the battery voltage detection unit, the battery temperature detection unit, the battery level indicating unit, the motor work indicating lamp and the illumination lamp are respectively connected to the single chip microcomputer unit, and the motor driving unit is connected to a motor for controlling a pipe expanding head to advance/retreat.

Figure 14:
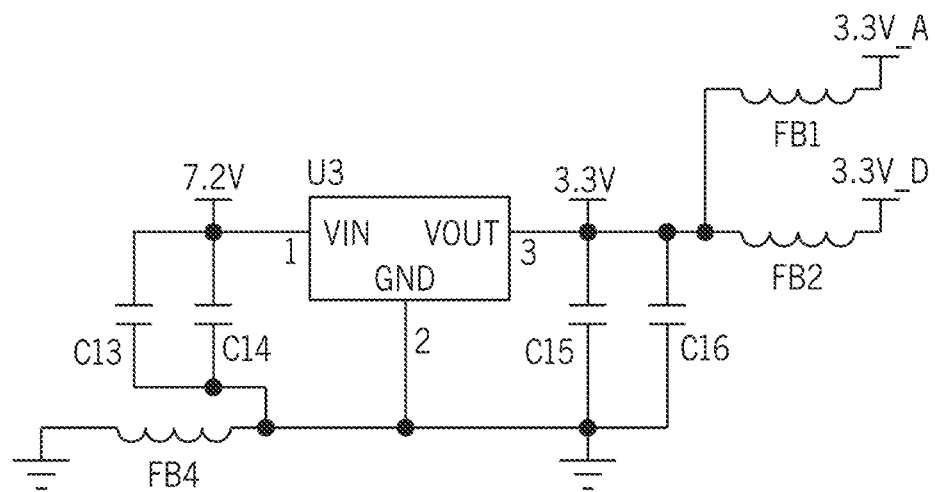
FIG. 14 is a schematic circuit diagram of a power conversion unit of the present invention.

A specific structure of the control circuit of the present embodiment is described below. In the present embodiment, electric power of the power supply unit is supplied by a battery 13. The power supply unit includes a power supply conversion circuit and a main power supply switch circuit. As shown in FIG. 14, the power supply conversion circuit includes a three-terminal voltage regulator module U3, the three-terminal voltage regulator module U3 uses a 7533-2 chip, a pin 1 of the three-terminal voltage regulator module U3 is connected to a voltage 7.2 V, and additionally, the pin 1 of the three-terminal voltage regulator module U3 is grounded PGND through a parallel circuit of a capacitor C13 and a capacitor C14, a pin 2 of the three-terminal voltage regulator module U3 is grounded PGND, a pin 3 of the three-terminal voltage regulator module U3 outputs a voltage 3.3 V, and additionally, the pin 3 of the three-terminal voltage regulator module U3 is grounded DGND through a parallel circuit of a capacitor C15 and a capacitor C16. The pin 2 of the three-terminal voltage regulator module U3 is grounded DGND through a magnetic bead FB4. One path of the voltage 3.3 V output by the pin 3 of the three-terminal voltage regulator module U3 outputs a voltage 3.3V_A through a magnetic bead FB1, and the other path of the voltage 3.3 V output by the pin 3 of the three-terminal voltage regulator module U3 outputs a voltage 3.3V_D through a magnetic bead FB2. In the power supply conversion circuit, the voltage 7.2 V is the voltage output by the battery, and that is, the voltage 7.2 V is connected to a positive electrode of the battery. The power supply conversion circuit coverts the voltage output by the battery into a voltage 3.3V_D and a voltage 3.3 V_A for each circuit module to use.

Figure 15:
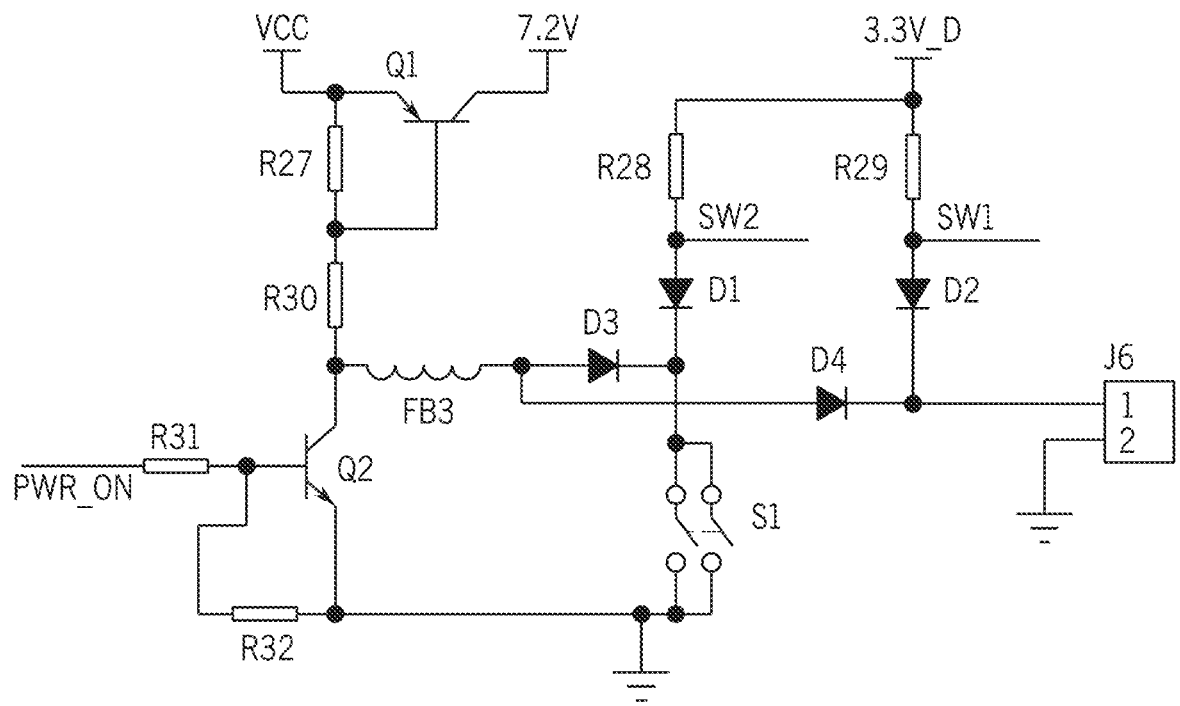
FIG. 15 is a schematic circuit diagram of a main power supply switch circuit of the present invention.
Figure 16A:
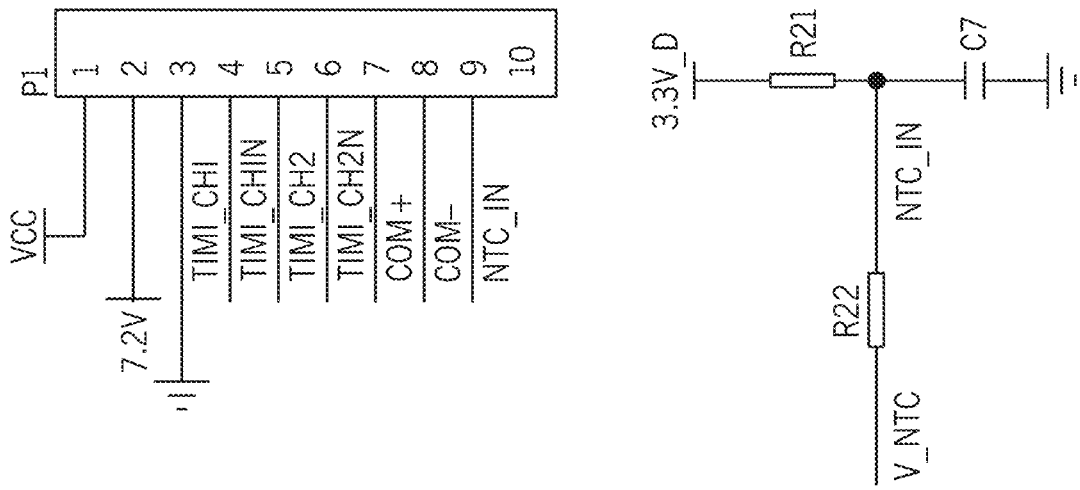
FIGS. 16A and 16B together form FIG. 16, which is a schematic circuit diagram of a single chip microcomputer unit, a mandrel stroke detection unit, a wrench position detection unit, a battery voltage detection unit, a battery temperature detection unit, a battery level indicating unit, a motor work indicating lamp and a pipe expander external illumination lamp of the present invention.
Figure 16A:
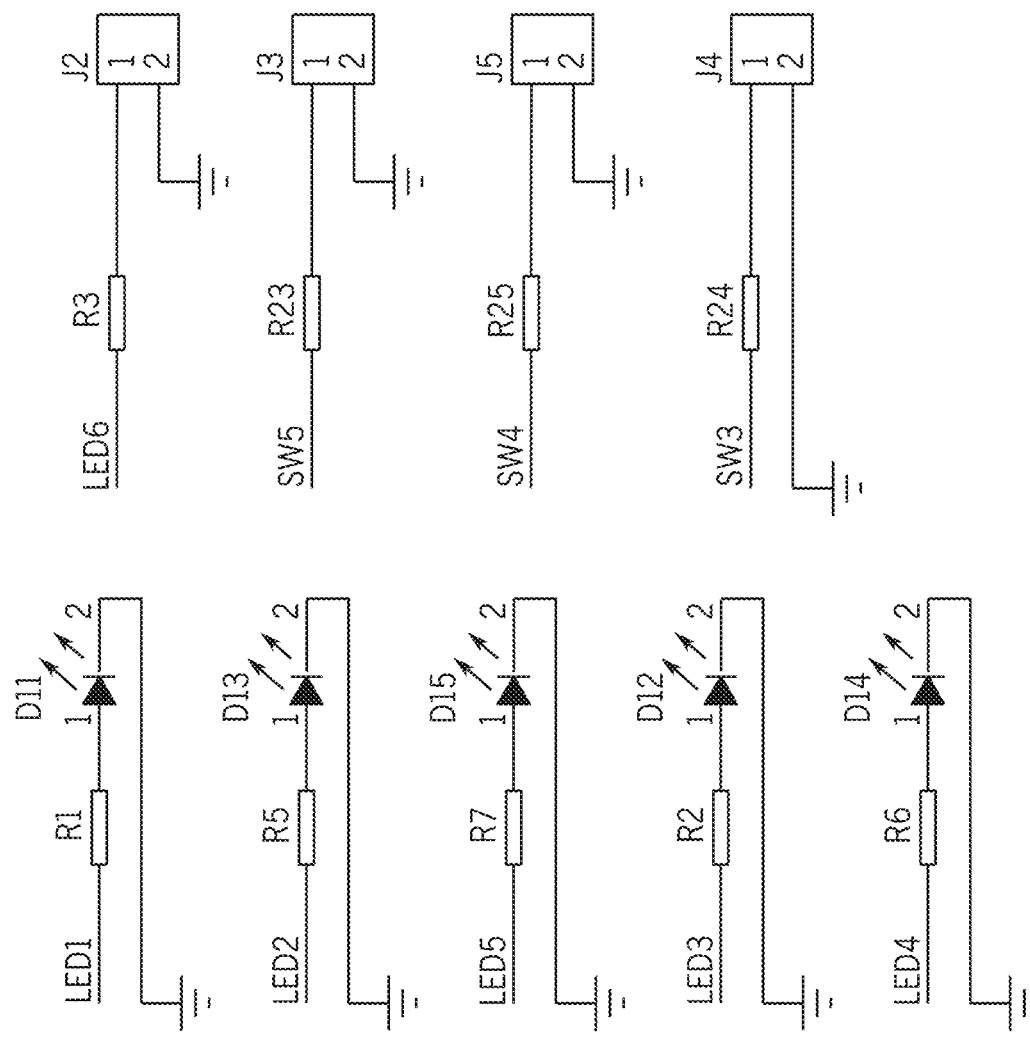
Figure 16B:
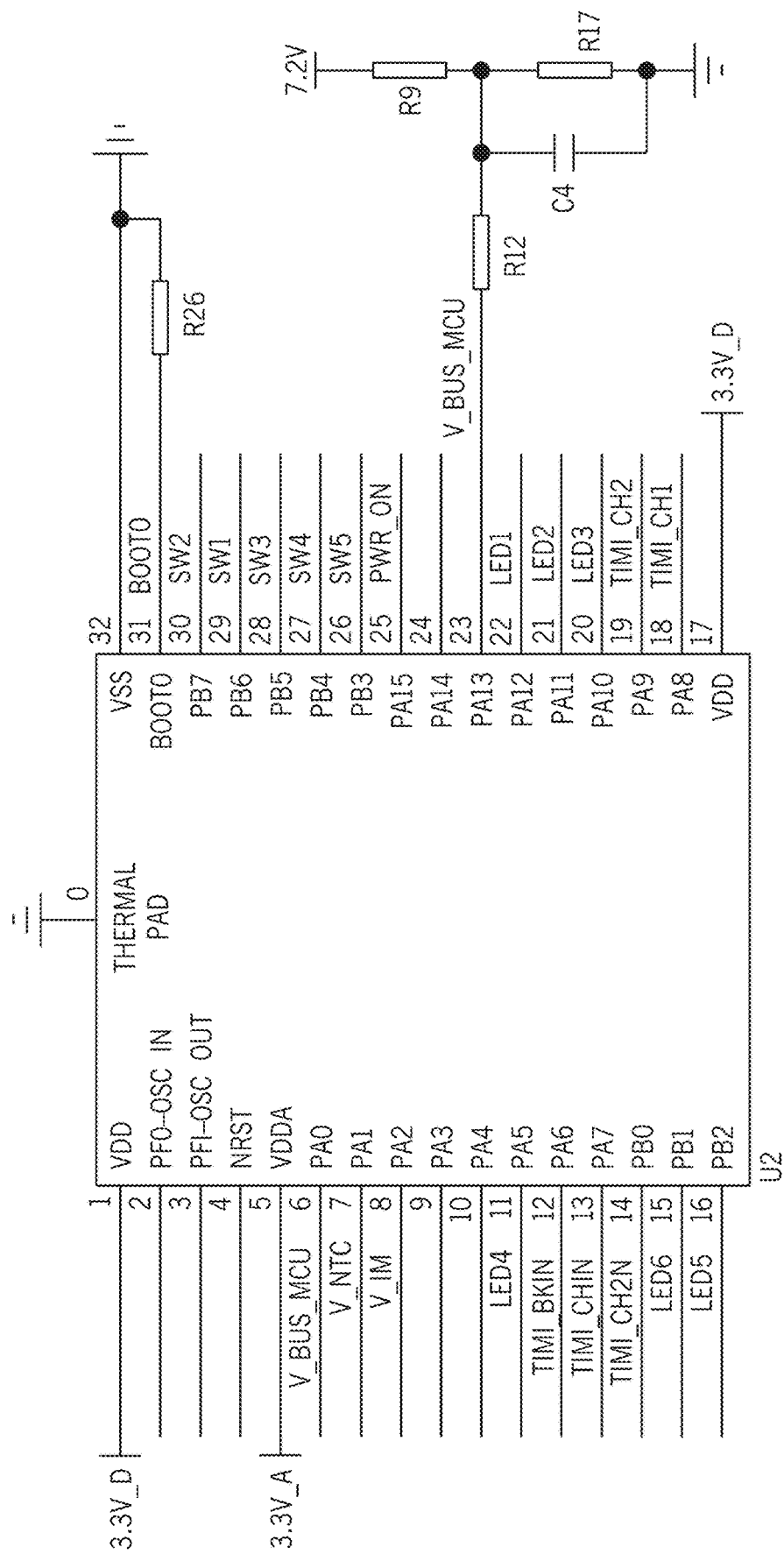

In the present embodiment, as shown in FIG. 16 (which is formed by FIGS. 16A and 16B), the single chip microcomputer unit includes a single chip microcomputer U2, and the single chip microcomputer U2 is an STM32F031 single chip microcomputer. A pin 1 and a pin 17 of the single chip microcomputer U2 are both connected to a voltage 3.3V_D, a pin 5 of the single chip microcomputer U2 is connected to a voltage 3.3V_A, a pin 32 of the single chip microcomputer U2 is grounded, and a pin 31 of the single chip microcomputer U2 is grounded through a resistor R26. The illumination lamp is disposed on the pipe expanding device, the illumination lamp is connected to an interface J2 in FIG. 14, a pin 1 of the interface J2 is connected to a pin 15 of the single chip microcomputer U2 through a resistor R3, and a pin 2 of the interface J2 is grounded. As shown in FIG. 15, the main power supply switch circuit includes an illumination switch S1 and a wake-up switch J6, one end of the illumination switch S1 is grounded, the other end of the illumination switch S1 is connected to negative electrodes of a diode D1 and a diode D3, a positive electrode of the diode D1 is connected to a voltage 3.3V_D through a resistor R28 and is connected to a pin 30 of the single chip microcomputer U2, a positive electrode of the diode D3 is connected to a positive electrode of a diode D4, a negative electrode of the diode D4 is connected to one end of the wake-up switch J6 and is connected to a negative electrode of a diode D2, the other end of the wake-up switch J6 is grounded, a positive electrode of the diode D2 is connected to a voltage 3.3V_D through a resistor R29 and is connected to a pin 29 of the single chip microcomputer U2, the positive electrode of the diode D3 is connected to a collecting electrode of a triode Q2 through a magnetic bead FB3, an emitting electrode of the triode Q2 is grounded, a base electrode of the triode Q2 is connected to a pin 25 of the single chip microcomputer U2 through a resistor R31 and is grounded through a resistor R32, the collecting electrode of the triode Q2 is connected to a base electrode of a triode Q1 through a resistor R30, a resistor R27 is connected between the base electrode of the triode Q1 and an emitting electrode of the triode Q1, the emitting electrode of the triode Q1 is connected to a voltage VCC, and a collecting electrode of the triode Q1 is connected to a battery output voltage 7.2 V.

As shown in FIG. 16, the battery voltage detection unit includes a resistor R9 and a resistor R17, one end of the resistor R9 is connected to the battery output voltage 7.2 V, the other end of the resistor R9 is grounded through the resistor R17, a capacitor C4 is connected in parallel onto the resistor R17, and a connecting point of the resistor R9 and the resistor R17 is connected to a pin 6 of the single chip microcomputer U2 through a resistor R12. The battery level indicating unit includes four light emitting diodes arranged into a row, i.e., light emitting diodes D11 to D14, negative electrodes of the light emitting diodes D11 to D14 are all grounded, and positive electrodes of the light emitting diodes D11 to D14 are respectively connected to a pin 22, a pin 21, a pin 20 and a pin 11 of the single chip microcomputer U2 through a resistor R1, a resistor R2, a resistor R5 and a resistor R6. The battery temperature detection unit includes a thermistor disposed on a battery pack, one end of the thermistor is grounded, the other end of the thermistor outputs an NTC IN signal and is connected to a pin 10 of an interface P1, the pin 10 of the interface P1 is connected to a connecting point of a resistor R21 and a capacitor C7, the other end of the resistor R21 is connected to a voltage 3.3V_D, and the other end of the capacitor C7 is grounded. The connecting point of the resistor R21 and the capacitor C7 is connected to a pin 7 of the single chip microcomputer U2 through a resistor R22. A pin 1 of the interface P1 is connected to a voltage VCC, a pin 2 of the interface P1 is connected to a battery output voltage 7.2 V, a pin 3 of the interface P1 is grounded PGND, and a pin 4, a pin 5, a pin 6 and a pin 7 of the interface P1 are respectively connected to a pin 18, a pin 13, a pin 19 and a pin 14 of the single chip microcomputer U2. The interface P1 is connected to the motor driving unit through wires, the pin 4, the pin 5, the pin 6 and the pin 7 of the interface P1 output signals to the motor driving unit so as to drive the mandrel motor of the pipe expander, the pin 7 and a pin 8 of the interface P1 are connected to two ends of a current sampling resistor disposed on the motor so as to acquire working current of the motor and transmits the result to the motor current acquisition unit.

Figure 17:
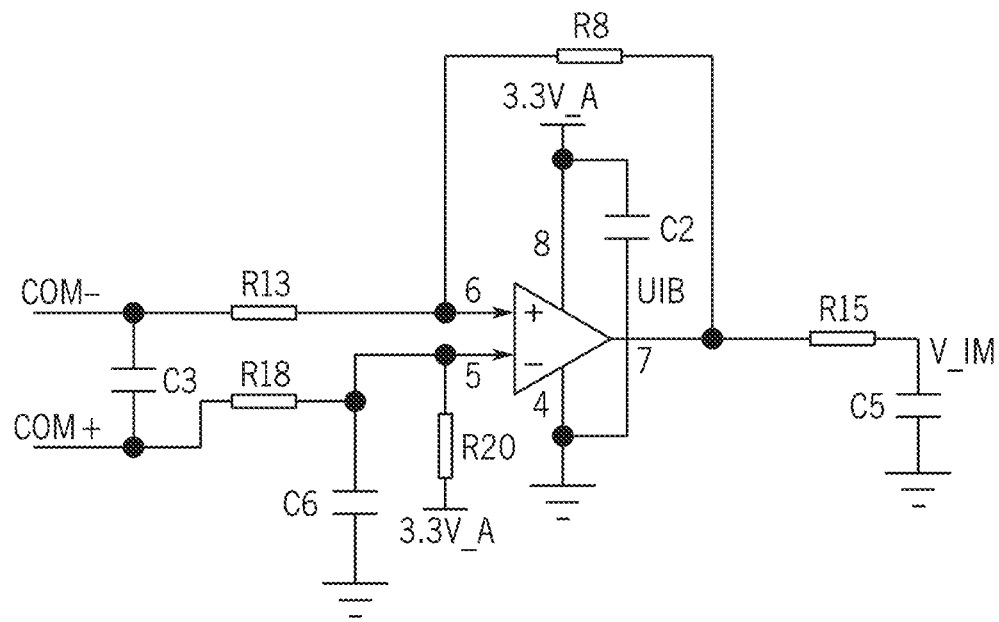
FIG. 17 is a schematic circuit diagram of a motor current acquisition unit of the present invention.
Figure 18:
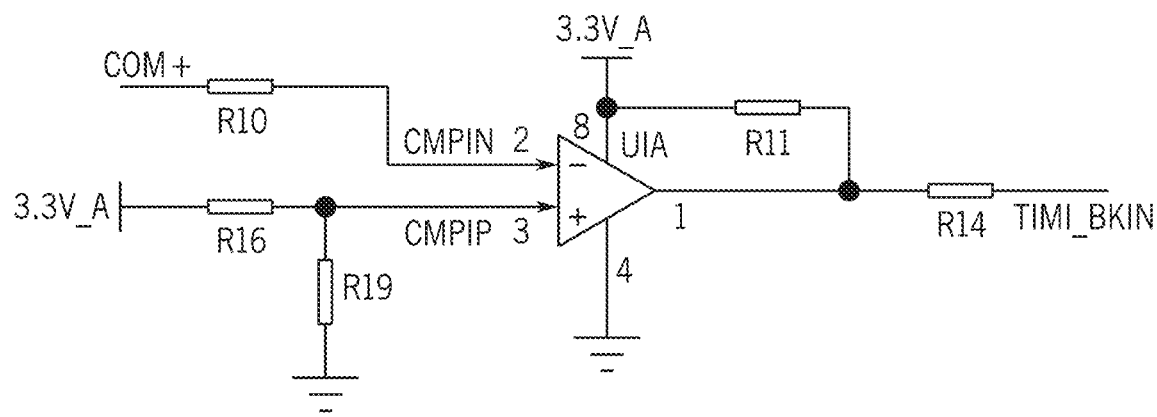
FIG. 18 is a schematic circuit diagram of a motor short circuit protection unit of the present invention.

As shown in FIG. 17, the motor current acquisition unit includes an operational amplifier U1B, an inverted phase input end and an in-phase input end of the operational amplifier U1B are respectively connected to a pin 9 and the pin 8 of the interface P1 through a resistor R13 and a resistor R18, the inverted phase input end of the operational amplifier U1B is connected to an output end of the operational amplifier U1B through a resistor R8, the in-phase input end of the operational amplifier U1B is grounded through a capacitor C6 and is connected to a voltage 3.3V_A through a resistor R20, the output end of the operational amplifier U1B is grounded through a series circuit of a resistor R15 and a capacitor C5, and a connecting point of the resistor R15 and the capacitor C5 is connected to a pin 8 of the single chip microcomputer U2. As shown in FIG. 18, the motor short circuit protection unit includes an operational amplifier U1A, an inverted phase input end of the operational amplifier U1A is connected to the pin 8 of the interface P1 through a resistor R10, the in-phase input end of the operational amplifier U1A is connected to a voltage 3.3V_A through a resistor R16 and is grounded through a resistor R19, one path of an output end of the operational amplifier U1A is connected to a voltage 3.3V_A through a resistor R11, and the other path of the output end of the operational amplifier U1A is connected to a pin 12 of the single chip microcomputer U2 through a resistor R14. The operational amplifier U1A and the operational amplifier U1B use LMV358 operational amplifier chips.

As shown in FIG. 16, the motor work indicating lamp is a light emitting diode D15, a positive electrode of the light emitting diode D15 is connected to a pin 16 of the single chip microcomputer U2 through a resistor R7, and a negative electrode of the light emitting diode D15 is grounded. The mandrel stroke detection unit includes a pipe expanding head advancing position limiting switch J3 and a pipe expanding head retreating position detection switch J5 which are disposed in the pipe expander and are respectively positioned at a front end and a rear end of the mandrel advancing and retreating stroke. Specifically, the pipe expanding head advancing position limiting switch J3 is disposed at a front portion of the pipe expander, and corresponds to the position of the side surface of the chuck. The pipe expanding head retreating position detection switch J5 is disposed at a rear portion of the pipe expending head and near a rear cover of the pipe expander, i.e., a pipe expanding head retreating position detection switch 31. One pin of the pipe expanding head advancing position limiting switch J3 is grounded, the other pin of the pipe expanding head advancing position limiting switch J3 is connected to a pin 26 of the single chip microcomputer U2 through a resistor R23. One pin of the pipe expanding head retreating position detection switch J5 is grounded, and the other pin of the pipe expanding head retreating position detection switch J5 is connected to a pin 27 of the single chip microcomputer U2 through a resistor R25. The wrench position detection unit includes a wrench position detection switch J4 disposed on the pipe expander, the arrangement position of the wrench position detection switch J4 corresponds to the position of the wrench, one pin of the wrench position detection switch J4 is grounded, and the other pin of the wrench position detection switch J4 is connected to a pin 28 of the single chip microcomputer U2 through a resistor R24. In the present embodiment, grounding terminals all refer to grounded DGND unless otherwise specified.

The motor current acquisition unit detects the motor work current, and transmits the result to the single chip microcomputer. When a set value is exceeded, the single chip microcomputer can control the motor to stop rotating, and the machine is prevented from burn damage. The motor short circuit protection unit detects whether the motor generates a short circuit or not, once the short circuit is detected, the single chip microcomputer immediately controls the motor to stop rotating, and a protection effect is achieved on the motor and the pipe expander. The motor work indicating lamp, i.e., the light emitting diode D15 indicates the operation of the motor. The light emitting diode D15 is on when the motor rotates, and the light emitting diode D15 is off when the motor stops rotating. The battery voltage detection unit detects the battery level, and transmits the result to the single chip microcomputer, the single chip microcomputer outputs a signal to control the on-off state of the battery level indicating lamp consisting of the four light emitting diodes, and the battery level is indicated by the number of on/off light emitting diodes of the four light emitting diodes arranged into a row. The battery temperature detection unit detects the temperature of the battery pack, and transmits the result to the single chip microcomputer, when the temperature exceeds a set value, the single chip microcomputer controls the motor to stop rotating, and an overtemperature protection effect is achieved. In the pipe expanding process, the torque of the motor is transmitted to the single chip microcomputer through the interface P1, the output torque of the motor can be gradually increased, and when the output torque reaches a set value, the pipe socket of an expanded copper pipe can reach a qualified dimension. When detecting that the motor torque value reaches a preset value, the single chip microcomputer gives out an instruction, the motor starts to reversely rotate until the mandrel retreats to the initial position before starting. The pipe expanding head advancing position limiting switch J3 detects whether the pipe expanding head advances to exceed an allowable range or not (if YES, damage of the pipe expander may be caused), and the pipe expanding head retreating position detection switch J5 detects whether the pipe expending head retreats to the initial position before starting. The wrench position detection switch J4 detects whether the wrench on the pipe expander is in a closed locked state or an open state, detection signals of the above three switches are respectively sent to the single chip microcomputer, the single chip microcomputer gives a corresponding control signal to the motor driving unit according to the detected conditions to control the motor to positively rotate, reversely rotate or stop rotating, and the automatic control of the pipe expanding head is achieved.

The work process of each of the switches will be illuminated hereafter.

Illumination switch S1. The illumination switch S1 controls the on-off state of the illumination lamp connected onto the interface J2. The illumination lamp is switched on by clicking the illumination switch S1 once, and is switched off after a next click. Cyclic control can be achieved. The illumination lamp is configured to illuminate a peripheral environment when the pipe expander is used and to enable an operator to be able to do pipe expanding work in a dark environment.

Wake-up switch J6. The whole control circuit can be woke up by pressing and holding the wake-up switch J6 for 1.5S, after the control circuit is woke up, if the wrench position detection switch J4 is in an on state, the result shows that the wrench is closed and locked, and the pipe expander starts to work by pressing the wake-up switch J6 again.

Wrench position detection switch J4. When the wrench is in a closed locking position, the wrench position detection switch J4 is switched on, and the pipe expander is started to work by pressing down the wake-up switch J6. When the mandrel motor positively rotates, if the wrench is open, the wrench position detection switch J4 is switched off, and the motor immediately rotates reversely, so that the pipe expanding head retreats to the initial position before starting.

Pipe expanding head retreating position detection switch J5. When the motor positively rotates, and the pipe expanding head advances to work, the pipe expanding head retreating position detection switch J5 is in an off state. When the work of the pipe expanding head is completed, the motor reversely rotates, the pipe expanding head retreats to the initial position before starting, the pipe expanding head retreating position detection switch J5 is in an on state, and at this moment, the single chip microcomputer gives out a signal to control the motor to stop working. The single chip microcomputer determines whether the pipe expanding head returns to the initial position or not by detecting whether the pipe expanding head retreating position detection switch J5 is switched on or not, if the pipe expanding head retreating position detection switch J5 is in the on state, the result shows that the pipe expanding head has returned to the initial position, and the motor stops rotating.

Pipe expanding head advancing position limiting switch J3. The pipe expanding head advancing position limiting switch J3 is in a normally off state, when the pipe expanding head advances to exceed the allowable range (damage of the pipe expander may be caused), the pipe expanding head advancing position limiting switch J3 is switched on, and at this moment, the single chip microcomputer immediately gives out a signal to control the motor to reversely rotate, so that the pipe expanding head retreats till returning to the initial position before starting. The effect is to avoid the occurrence of a machine damage phenomenon caused when an operator starts the pipe expander by mistake when the chuck is not installed.

Embodiment 2

Figure 9:
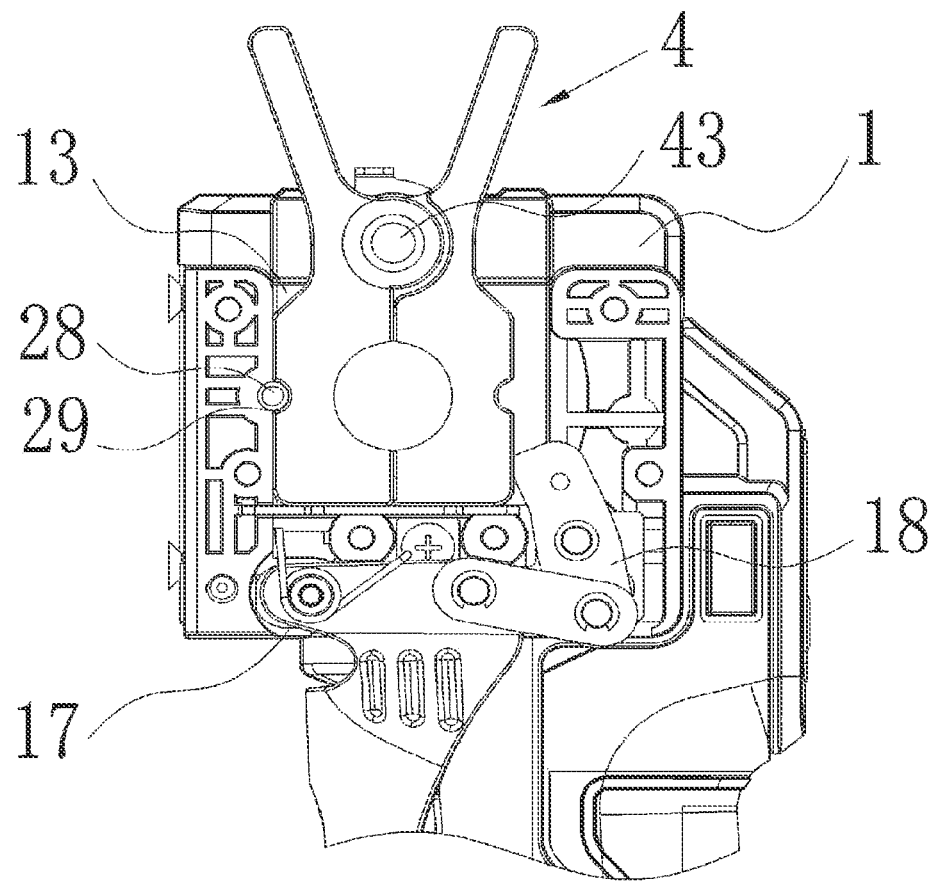
FIG. 9 is a schematic local structure diagram of the present invention in a second implementation.
Figure 10:
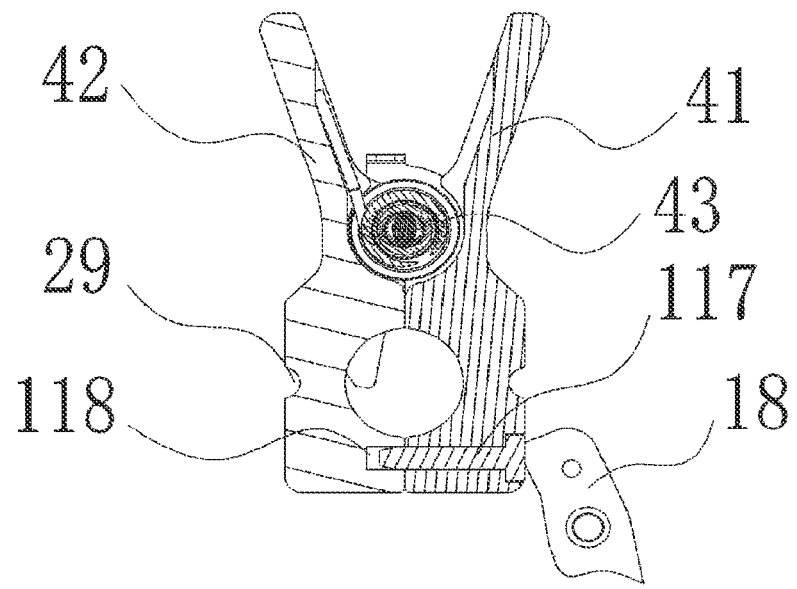
FIG. 10 is a partial cross-sectional view as shown in FIG. 9.

As shown in FIG. 9 and FIG. 10, a pressing end of the clamping connecting rod mechanism 18 abuts the positioning bulge 117 of the chuck body 4, and maintains sliding connection with a side wall surface of the chuck body 4. The rest of the parts are completely the same as those of Embodiment 1.

The specific embodiments described herein are merely illustrative of the concept of the present invention. Those skilled in the art to which the present invention pertains may make various modifications or additions or similar replacements to the described specific embodiments without departing from the spirit of the present invention or beyond the scope defined by the appended claims.

I claim:
1. An electric pipe expander, comprising:
a pipe expander body; and
a mandrel sliding cavity provided on the pipe expander body,
wherein a clamping head body capable of clamping a pipe to be processed is provided at an opening end of the mandrel sliding cavity,
a mandrel is slidably connected in the mandrel sliding cavity,
an outer side end of the mandrel is provided with an inclined pipe expanding cone, an inner side end of the mandrel is provided with with an elastomer accommodating cavity, a guide screw with a drive nut is provided on the pipe expander body opposite to an opening of the elastomer accommodating cavity, the guide screw extends into the elastomer accommodating cavity, and a flat key is provided on the mandrel, an outer side end of the flat key is slidingly connected to a worm gear mechanism in an axial direction, an inner side end of the flat key is slidingly connected to an axial key groove of the drive nut, and an elastomer is sandwiched between the flat key and a bottom surface of the elastomer accommodating cavity, the elastomer is an annular rubber piece, and the guide screw extends into a central hole of the elastomer; by deforming the elastomer itself, an axial moving speed of the mandrel is reduced, and a circumferential shape of a flare of the pipe becomes uniform.

2. The electric pipe expander according to claim 1, wherein a cone positioning hole is provided on an end surface of the mandrel corresponding to the pipe expanding cone, an axis of the cone positioning hole forms an included angle with an axis of the mandrel, and the pipe expanding cone is rotatably connected in the cone positioning hole via a cone bearing.

3. The electric pipe expander according to claim 1, wherein a mandrel bearing is embedded in the pipe expander body corresponding to an outer side end of the mandrel, a support ring is provided between a central hole of the mandrel bearing and an outer ring surface of the mandrel, and an inner end of the support ring extends into a central hole of a worm wheel on the worm gear mechanism and is fitted with the worm wheel.

4. The electric pipe expander according to claim 1, wherein a pipe expanding cavity is provided on the pipe expander body corresponding to the clamping head body, a clamping end of the clamping head body extends into the pipe expanding cavity and is clamped and fixed via a clamping link mechanism, and an outer end surface of the clamping end abuts against an inner wall surface corresponding to the pipe expanding cavity.

5. The electric pipe expander according to claim 4, wherein a link accommodating cavity is provided on a portion of the pipe expander body corresponding to a periphery of the pipe expanding cavity, the clamping link mechanism is provided in the link accommodating cavity, a pressing plate corresponding to one end of the clamping link mechanism extends into the pipe expanding cavity, and another end of the clamping link mechanism is connected to a linkage wrench extending outside the pipe expander body.

6. The electric pipe expander according to claim 5, wherein an adjusting screw is rotatably connected to the pipe expander body, and when the adjusting screw is rotated, the link mechanism is driven, and the pressing plate is clamped and abutted on a side wall of the clamping head body.

7. The electric pipe expander according to claim 5, wherein an end portion of the pressing plate corresponding to the clamping head body extends horizontally and outwardly to form a trapezoidal pressing head, a side wall of the clamping head body corresponding to the trapezoidal pressing head is provided with a trapezoidal clamping opening, and when the clamping head body is clamped by the pressing plate, the pressing plate abuts on a bottom surface of the trapezoidal clamping opening via a bottom edge of the trapezoidal pressing head, and abuts on a sloping edge of the trapezoidal clamping opening via a sloping edge of the trapezoidal pressing head.

8. The electric pipe expander according to claim 1, wherein an outer cover of the pipe expander body is provided with a plastic housing, the plastic housing in turn extends outwards to form an electric motor accommodating cavity, an electric motor is provided in the electric motor accommodating cavity, an output shaft end of the electric motor is connected to the worm gear mechanism, and another end of the electric motor is electrically connected to a rechargeable battery.

9. The electric pipe expander according to claim 1, wherein the clamping head body comprises a left clamping body and a right clamping body, middle portions of the left clamping body and the right clamping body are rotatably connected to a rotary shaft, the left clamping body and the right clamping body corresponding to one side of the rotary shaft form a clamping end for clamping the pipe to be processed, and the left clamping body and the right clamping body corresponding to another end of the rotary shaft, respectively form a force application handle.

\* \* \* \* \*